United States Patent
Chou et al.

(10) Patent No.: US 11,564,251 B2
(45) Date of Patent: Jan. 24, 2023

(54) DATA PACKET DELIVERY IN RRC INACTIVE STATE

(71) Applicant: FG Innovation Company Limited, Tuen Mun (HK)

(72) Inventors: Chie-Ming Chou, Hsinchu (TW); Yung-Lan Tseng, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/900,802

(22) Filed: Jun. 12, 2020

(65) Prior Publication Data

US 2020/0314893 A1 Oct. 1, 2020

Related U.S. Application Data

(63) Continuation of application No. 15/809,238, filed on Nov. 10, 2017, now Pat. No. 10,728,927.

(60) Provisional application No. 62/420,588, filed on Nov. 11, 2016.

(51) Int. Cl.
*H04W 74/00* (2009.01)
*H04W 76/27* (2018.01)
*H04W 74/04* (2009.01)
*H04W 74/08* (2009.01)

(52) U.S. Cl.
CPC ......... *H04W 74/006* (2013.01); *H04W 74/04* (2013.01); *H04W 76/27* (2018.02); *H04W 74/0833* (2013.01)

(58) Field of Classification Search
CPC ............... H04W 74/006; H04W 74/04; H04W 74/0833; H04W 76/27
See application file for complete search history.

(56) References Cited

U.S. PATENT DOCUMENTS

| | | | |
|---|---|---|---|
| 10,873,975 B2 * | 12/2020 | Freda | H04W 74/0833 |
| 2007/0147370 A1 * | 6/2007 | Hasegawa | H04W 36/06 370/390 |
| 2017/0156158 A1 * | 6/2017 | Harris | H04W 52/0216 |
| 2020/0037345 A1 * | 1/2020 | Ryoo | H04W 76/27 |

* cited by examiner

*Primary Examiner* — Rhonda L Murphy
(74) *Attorney, Agent, or Firm* — ScienBiziP, P.C.

(57) ABSTRACT

A method for wireless communication includes transmitting, by a User Equipment (UE) in a Radio Resource Control (RRC) Inactive (RRC_Inactive) state, at least one packet to a base station, and receiving, by the UE in the RRC_Inactive state, an acknowledgement or non-acknowledgement (ACK/NACK) message from the base station in response to the at least one packet transmitted by the UE.

20 Claims, 13 Drawing Sheets

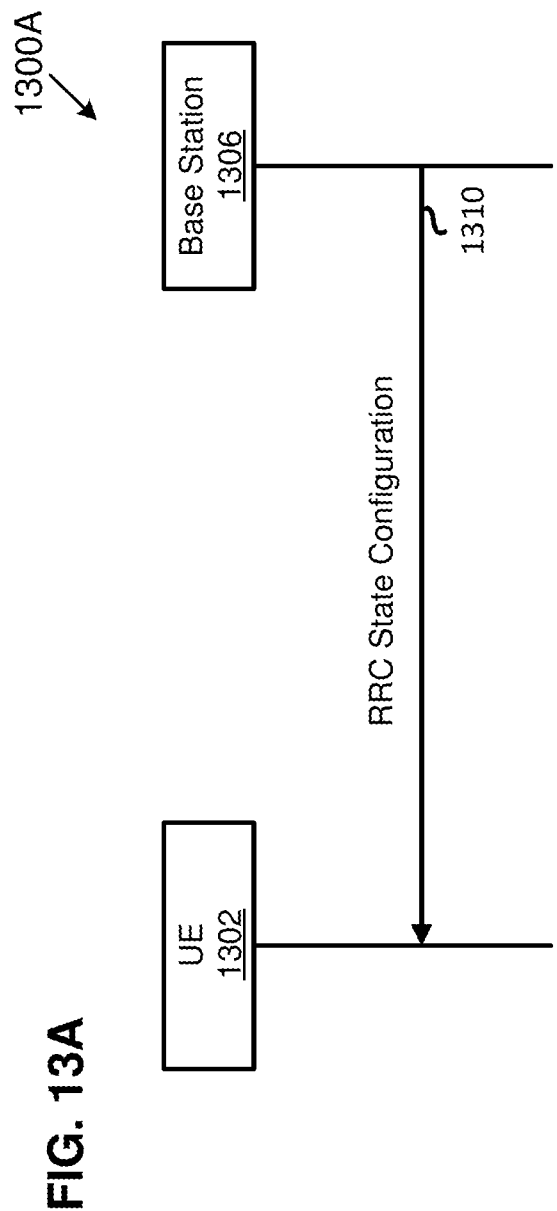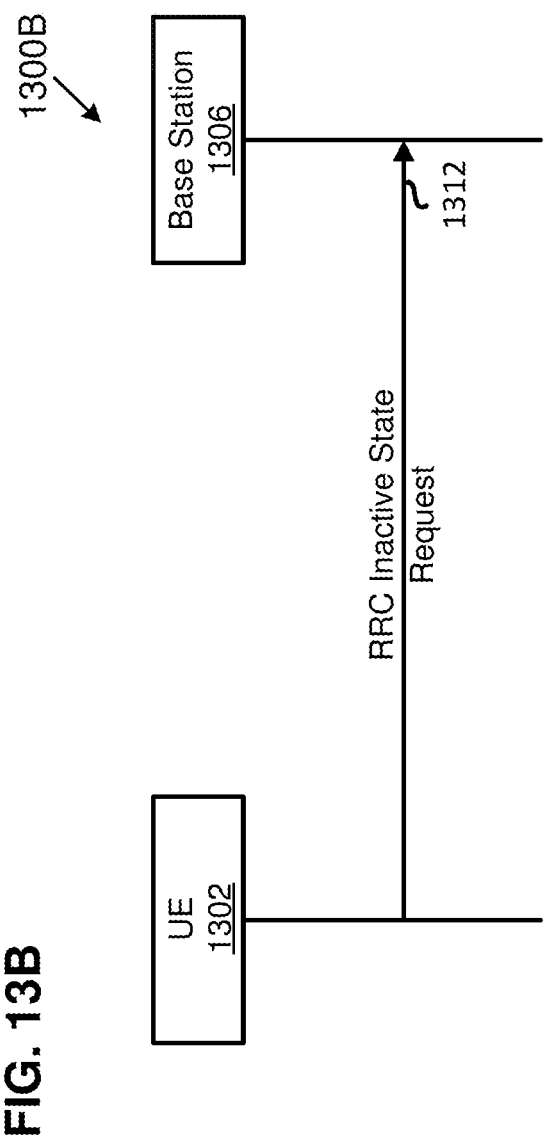
FIG. 13A
FIG. 13B

DATA PACKET DELIVERY IN RRC INACTIVE STATE

CROSS-REFERENCE TO RELATED APPLICATION(S)

This application is a continuation application of U.S. patent application Ser. No. 15/809,238 filed Nov. 10, 2017, which claims the benefit of and priority to provisional U.S. Patent Application Ser. No. 62/420,588 filed Nov. 11, 2016. The contents of all above-named applications are fully incorporated herein by reference for all purposes.

FIELD

The present application generally relates to wireless communications, and pertains particularly to data packet delivery in RRC Inactive state.

BACKGROUND

The 3rd Generation Partnership Project (3GPP) has introduced a new radio resource control (RRC) state: RRC Inactive state, for the next generation (e.g., 5G or new radio (NR)) wireless communication networks. RRC Inactive state aims to achieve power saving with acceptable access latency. When a user equipment (UE) is in RRC Inactive state, the next generation radio access network (e.g., 5G RAN) and the UE store the Access Stratum (AS) context (e.g., UE context) separately. In addition, while in RRC Inactive state, the UE does not have an RRC connection with the next generation radio access network (e.g., 5G RAN), although the next generation radio access network (e.g., 5G RAN) keeps a connection with the next generation core network (e.g., 5G CN) for the UE. Other characteristics of RRC Inactive state have been in development.

Thus, there is a need in the art for efficient packet delivery in RRC Inactive state to reduce signaling overhead, power consumption, and resource cost on both the UE side and the radio access network side.

BRIEF DESCRIPTION OF THE DRAWINGS

Aspects of the exemplary disclosure are best understood from the following detailed description when read with the accompanying Figures. Various features are not drawn to scale, dimensions of various features may be arbitrarily increased or reduced for clarity of discussion.

FIG. 13A is a diagram illustrating a base station delivering an RRC state configuration message to a UE, in accordance with an exemplary implementation of the present application.

FIG. 13B is a diagram illustrating a UE sending an RRC Inactive state request to a base station, in accordance with an exemplary implementation of the present application.

DETAILED DESCRIPTION

Figure 1A:
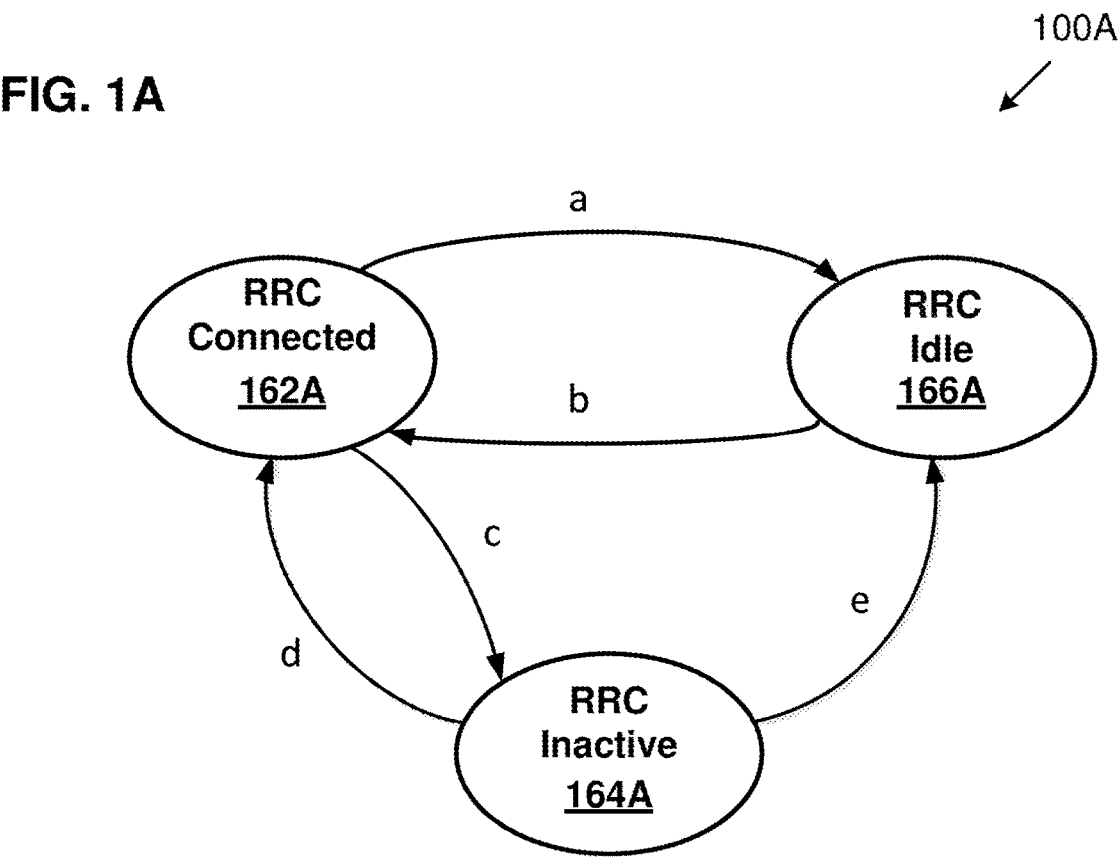
FIG. 1A is an RRC state transition diagram illustrating various RRC state transition procedures that a UE may undergo within a next generation radio access network, according to an exemplary implementation of the present application.

The following description contains specific information pertaining to implementations in the present application. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

For the purpose of consistency and ease of understanding, like features are identified (although, in some examples, not shown) by numerals in the exemplary figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the exemplary implementations described in this specification are oriented to software installed and executing on computer hardware, nevertheless, alternative exemplary implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

A radio communication network architecture (e.g., a long term evolution (LTE) system, a LTE-Advanced (LTE-A) system, or a LTE-Advanced Pro system) typically includes at least one base station, at least one user equipment (UE), and one or more optional network elements that provide connection towards a network. The UE communicates with the network (e.g., a core network (CN), an evolved packet core (EPC) network, an Evolved Universal Terrestrial Radio Access network (E-UTRAN), a Next-Generation Core (NGC), or an internet), through a radio access network (RAN) established by the base station.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a personal digital assistant (PDA) with wireless communication capability. The UE is configured to receive and transmit signals over an air interface to one or more cells in a radio access network.

A base station may include, but is not limited to, a node B (NB) as in the LTE, an evolved node B (eNB) as in the LTE-A, a radio network controller (RNC) as in the UMTS, a base station controller (BSC) as in the GSM/GERAN, a new radio evolved node B (NR eNB) as in the NR, a next generation node B (gNB) as in the NR, and any other apparatus capable of controlling radio communication and managing radio resources within a cell. The base station may connect to serve the one or more UEs through a radio interface to the network.

A base station may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic wideband-code division multiple access (W-CDMA), high-speed packet access (HSPA), LTE, LTE-A, New Radio (NR, often referred to as 5G), and/or LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe). Each cell may have overlapped coverage areas with other cells.

As discussed above, the frame structure for NR is to support flexible configurations for accommodating various next generation (e.g., 5G) communication requirements, such as enhanced mobile broadband (eMBB), massive machine type communication (mMTC), ultra reliable communication and low latency communication (URLLC), while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may be also used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval Tx of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in a NR frame to support ProSe services.

Referring to FIG. 1A, FIG. 1A is an RRC state transition diagram illustrating various RRC state transition procedures that a UE may undergo within a next generation radio access network, according to an exemplary implementation of the present application.

FIG. 1A is an RRC state transition diagram illustrating various RRC state transition procedures that a UE may undergo within a next generation radio access network, according to an exemplary implementation of the present application. RRC state transition diagram 100A includes RRC Connected state 162A, RRC Inactive state 164A, and RRC Idle state 166A. In the present implementation, RRC Connected state 162A, RRC Inactive state 164A, and RRC Idle state 166A are three RRC states independent of one another.

As shown in FIG. 1A, a UE may transition among RRC Connected state 162A, RRC Inactive state 164A, and RRC Idle state 166A through various procedures (e.g., procedures a, b, c, d, and e). For example, a UE may transition to RRC Inactive state 164A from RRC Connected state 162A or RRC Idle state 166A, and vice versa. It should be noted that in RRC state transition diagram 100A, a UE may not transition directly from RRC Idle state 166A to RRC Inactive state 164A. That is, a UE may transition to RRC Inactive state 164A from RRC Idle state 166A through RRC Connected state 162A. In one implementation, a UE may transition from RRC Connected state 162A to RRC Inactive state 164A by using an RRC Suspend procedure (e.g., procedure c). Conversely, the UE may transition from RRC Inactive state 164A to RRC Connected state 162A by using an RRC Resume procedure (e.g., procedure d).

Figure 1B:
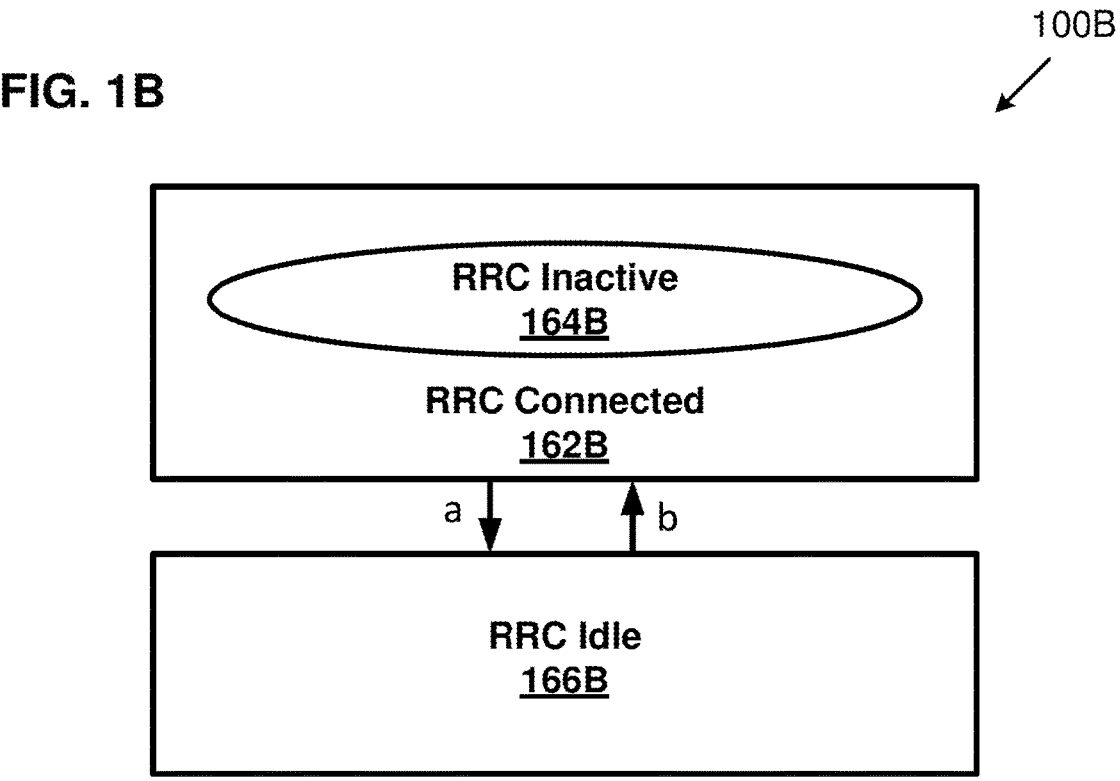
FIG. 1B is an RRC state transition diagram illustrating various RRC state transition procedures that a UE may undergo within a next generation radio access network, according to another exemplary implementation of the present application.

FIG. 1B is an RRC state transition diagram illustrating various RRC state transition procedures (e.g., procedures a and b) that a UE may undergo within a next generation radio access network, according to an exemplary implementation of the present application. In FIG. 1B, RRC state transition diagram 100B includes RRC Connected state 162B, RRC Inactive state 164B, and RRC Idle state 166B.

In this implementation, RRC Inactive state 164B is regarded as one sub-state of RRC Connected state 162B. As shown in FIG. 1B, a UE in RRC Idle state 166B may not transition directly to RRC Inactive state 164B and vice versa. A UE in RRC Idle state 166B may have to transition to RRC Connected state 162B before entering RRC Inactive state 164B, as a sub-state of RRC Connected state 162B. Once in RRC Connected state 162B, the UE is allowed to transition to RRC Inactive state 164B directly and vice versa.

In the present application, a UE may undergo RRC state transitions, following the RRC state transition procedures in FIG. 1A or 1B, based on RRC state configuration messages, for example, transmitted from a base station (e.g., eNB or gNB). After the UE receives an RRC state configuration message, the UE may apply state transitions based on the received RRC state configuration message.

In the present application, a radio access network (RAN) (e.g., 5G-RAN or NR-RAN) may configure a UE to send an RRC Resume Request during either a 2-step or a 4-step random access procedure. Before a random access procedure, however, it is also worthy to note that a RAN (e.g., the last serving base station, such as a gNB, which instructs the UE to move to RRC Inactive state) may pre-configure the random access configuration.

Figure 2A:
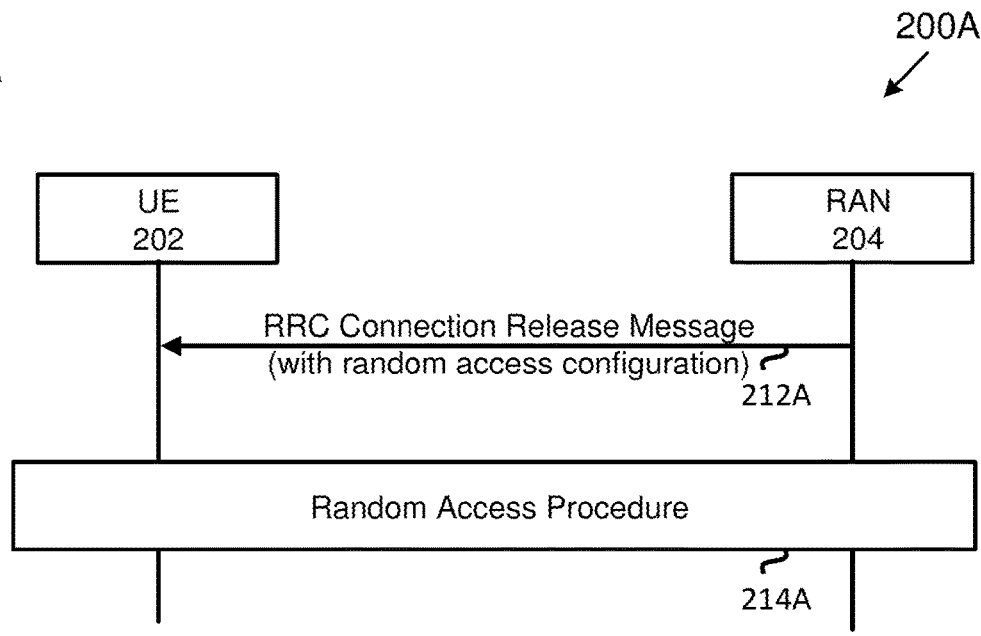
FIG. 2A illustrates a diagram of an RRC connection release message having a pre-configured random access configuration for a subsequent random access procedure, in accordance with an implementation of the present application.

FIG. 2A illustrates a diagram of an RRC Connection Release message having a pre-configured random access configuration for a subsequent random access procedure, in accordance with an implementation of the present application. As shown in FIG. 2A, diagram 200A includes actions 212A and 214A. In action 212A, RAN 204 may send an RRC Connection Release message along with a pre-configured random access configuration to UE 202. UE 202 may store the pre-configured random access configuration and transition to RRC Inactive state. When UE 202 desires to resume the RRC connection with RAN 204, for example, with a camped base station (e.g., gNB), or transmit or receive packet in RRC Inactive state, UE 202 may apply, in action 214A, a random access procedure based on the pre-configured random access configuration. The random access configuration may be provided to UE 202 through dedicated signaling (e.g., RRC signaling).

Figure 2B:
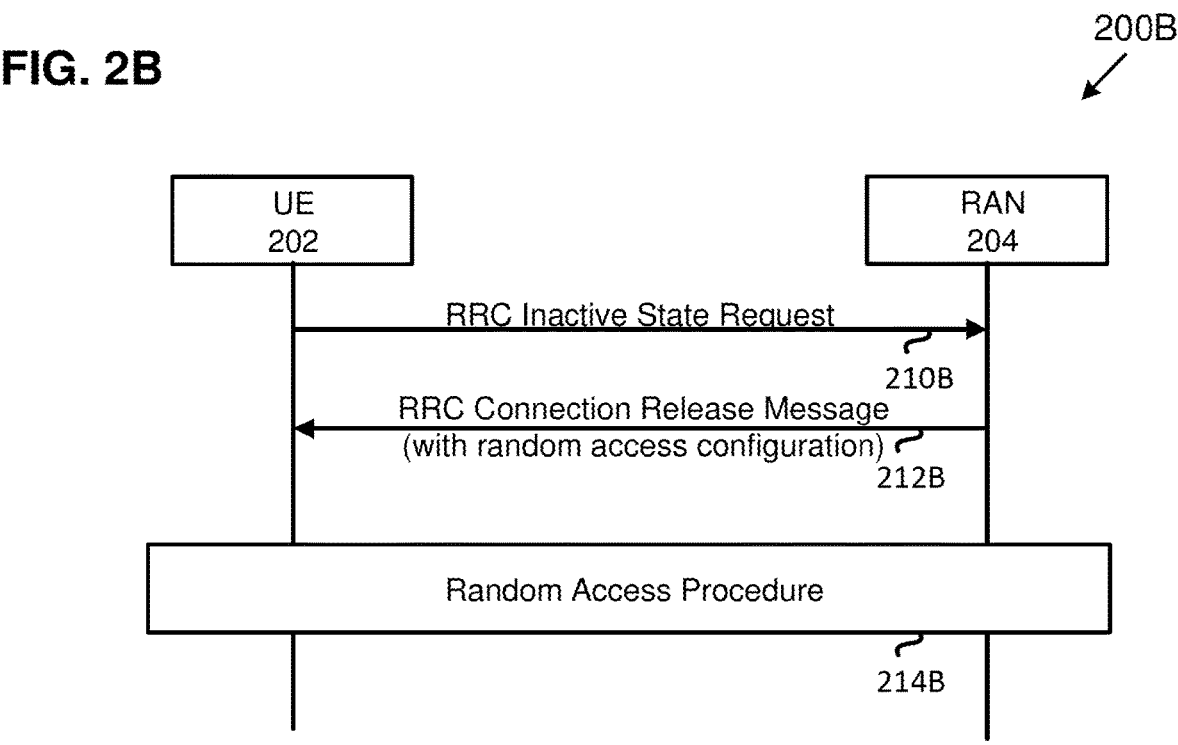
FIG. 2B illustrates a diagram of an RRC connection release message having a pre-configured random access configuration for a subsequent random access procedure, in accordance with another implementation of the present application.

FIG. 2B illustrates a diagram of an RRC Connection Release message having a pre-configured random access configuration for a subsequent random access procedure, in accordance with an implementation of the present application. As shown in FIG. 2B, diagram 200B includes actions 210B, 212B and 214B. In FIG. 2B, UE 202, RAN 204, actions 212B and 214B may substantially correspond to UE 202, RAN 204, actions 212A and 214A, respectively, in FIG. 2A. In contrast to FIG. 2A, diagram 200B includes action 210B, where UE 202 may send an RRC Inactive State Request message to RAN 204, before RAN 204 sends an RRC Connection Release message along with a pre-configured random access configuration to UE 202 in action 212B. Similar to action 214A in FIG. 2A, in action 214B, UE 202 may apply a random access procedure based on the pre-configured random access configuration received in action 212B. The random access configuration may be provided to UE 202 through dedicated signaling (e.g., RRC signaling).

In accordance with implementations of the present application, a base station may configure a UE in RRC Inactive state to realize a 2-step random access procedure or a 4-step random access procedure.

Figure 3A:
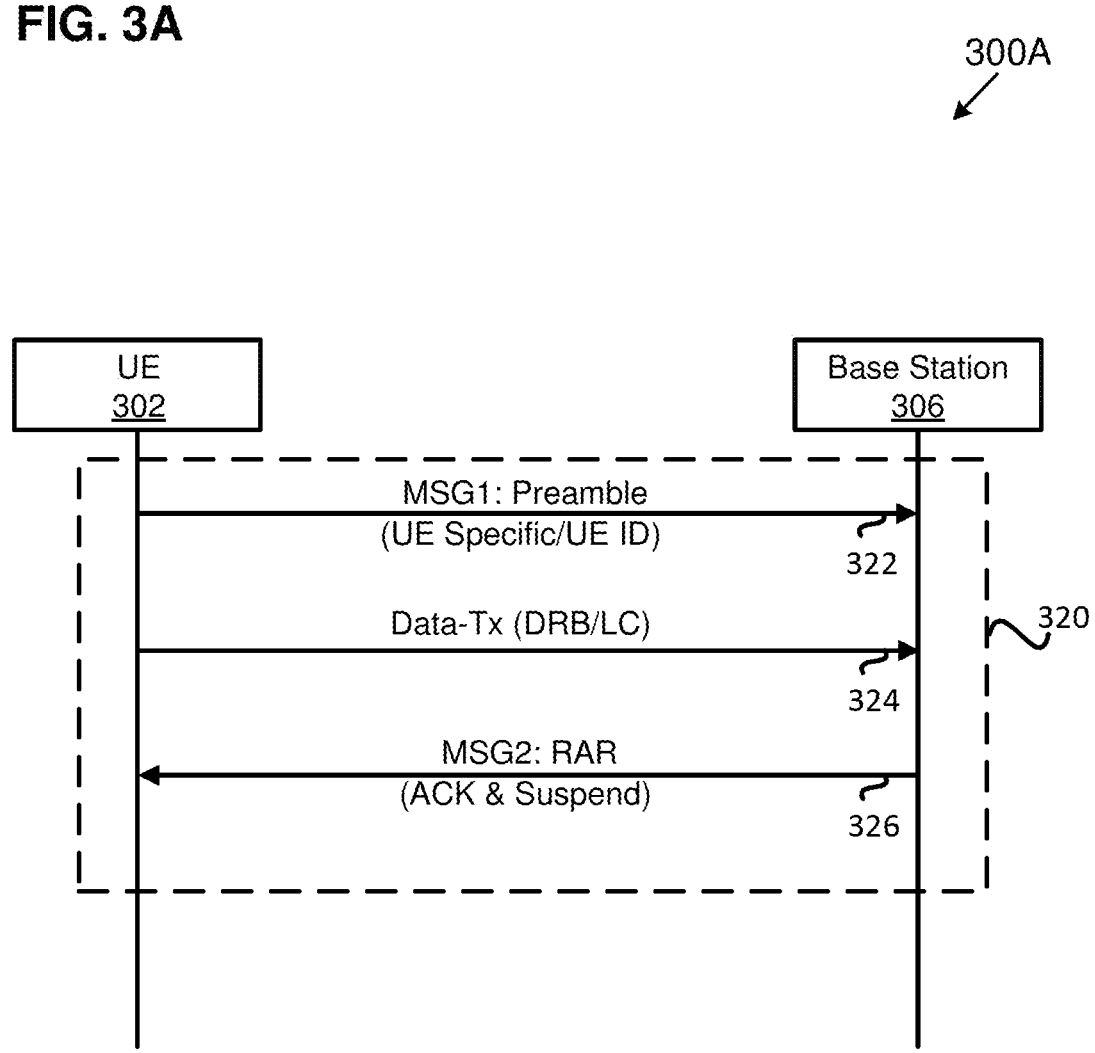
FIG. 3A is a diagram illustrating an uplink packet transmission from an RRC Inactive UE to a base station using a 2-step random access procedure, in accordance with an exemplary implementation of the present application.

FIG. 3A is a diagram illustrating an uplink packet transmission from an RRC Inactive UE to a base station using a 2-step random access procedure, in accordance with an exemplary implementation of the present application. In the present implementation, diagram 300A includes UE 302 and base station 306, where UE 302 may perform random access procedure 320 to transmit UL packet(s) to base station 306. Random access procedure 320 includes actions 322, 324, and 326.

In action 322 of random access procedure 320, an RRC Inactive UE 302 may send MSG1 to base station 306 of a radio access network (e.g., RAN 204 in FIGS. 2A and 2B). MSG1 may include a Random Access Preamble (Preamble). In one implementation, the Preamble may be a UE-specific preamble, which may be transmitted based on a pre-configured random access configuration, such that upon receiving the Preamble, base station 306 may identify UE 302. In another implementation, the Preamble may include a UE ID, such that upon receiving the Preamble, base station 306 may identify UE 302.

In action 324, UE 302 may transmit data packet(s) (e.g., small data packet(s)) on radio resources (e.g., DRBs or logical channels) indicated in the pre-configured random access configuration.

After base station 306 receives the data packet(s) from UE 302, in action 326, base station 306 may send MSG2 to UE 302, where MSG2 may include a Random Access Response message (e.g., ACK/NACK message) to UE 302. In one implementation, MSG2 may also include an RRC suspend message, such that RRC Inactive UE 302 may perform uplink data packet transmission without transitioning to RRC Connected state, thereby reducing network signaling overhead and conserving radio resource. In another implementation, MSG2 may include a Random Access Response message having an RRC Resume message, which may cause UE 302 to transition from RRC Inactive state to RRC Connected state.

Figure 3B:
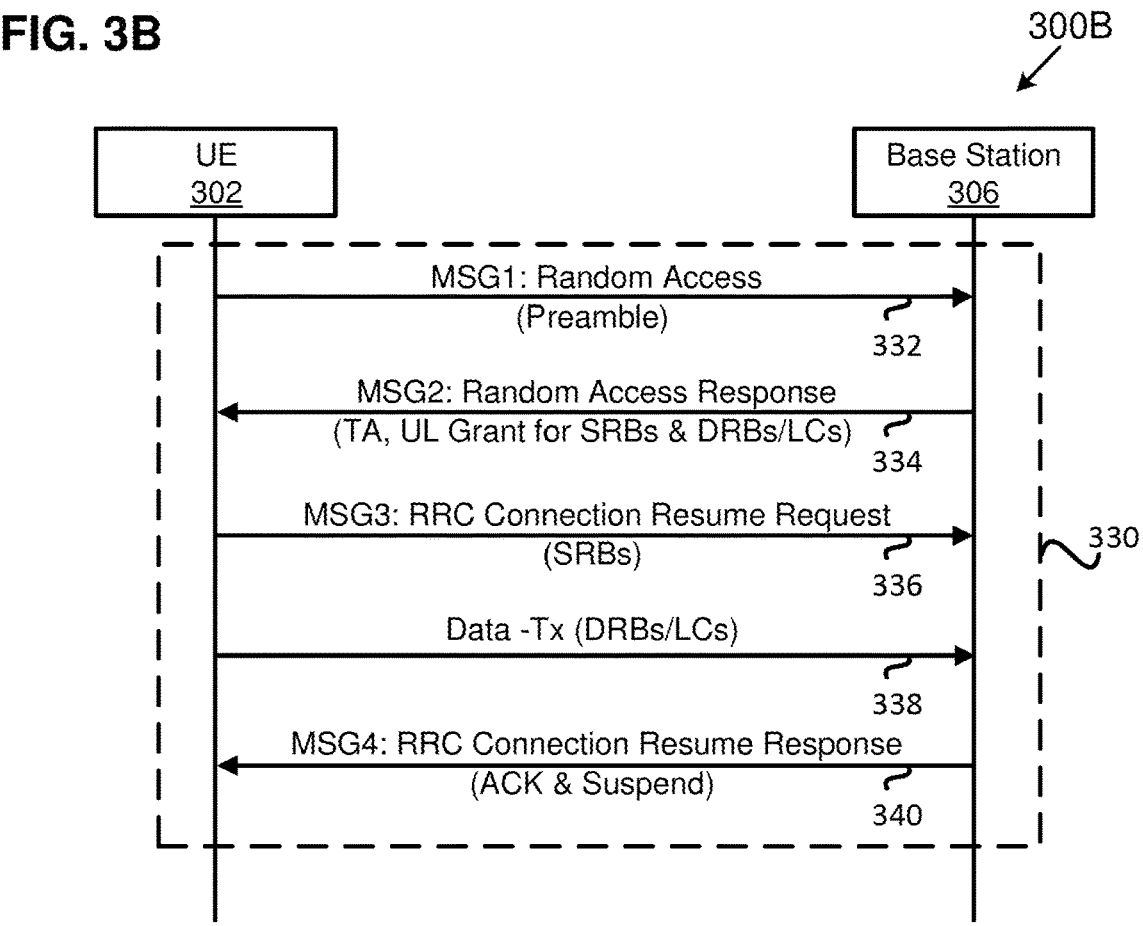
FIG. 3B is a diagram illustrating an uplink packet transmission from an RRC Inactive UE to a base station using a 4-step random access procedure, in accordance with an exemplary implementation of the present application.

FIG. 3B is a diagram illustrating an uplink packet transmission from an RRC Inactive UE to a base station using a 4-step random access procedure, in accordance with an exemplary implementation of the present application. In the present implementation, diagram 300B includes UE 302 and base station 306, where UE 302 may perform random access procedure 330 to transmit UL packet(s) to base station 306. Random access procedure 330 includes actions 332, 334, 336, 338, and 340.

In action 332 of random access procedure 330, an RRC Inactive UE 302 may send MSG1 to base station 306 of a radio access network (e.g., RAN 204 in FIGS. 2A and 2B). MSG1 may include a Random Access Preamble (Preamble).

In action 334, after base station 306 (and the associated RAN) receives the Preamble, base station 306 may send MSG2 to UE 302. MSG2 may include a Random Access Response. In one implementation, MSG2 may provide time advance and resource grant for at least one Signaling Radio Bearer (e.g., SRB0) and/or at least one Data Radio Bearer (DRB) or logical channel for UE 302 to deliver an RRC Connection Resume Request and data packet(s) (e.g., small data packet(s)), for example, in MSG3. In one implementation, each DRB may be mapped to a corresponding logical channel in the pending packet scheduling, such that there is a one-to-one mapping relationship between a DRB and a logical channel.

In action 336, RRC Inactive UE 302 may send MSG3 to base station 306. MSG3 may include an RRC Connection Resume Request, having an RRC Resume ID provided by base station 306, for example, using SRB0.

In addition, in action 338, UE 302 may also transmit data packet(s) (e.g., small data packet(s)) on indicated resource grant (e.g., radio resources granted by base station 306 in action 334). In some implementations, base station 306 may only provide UL grant for UE 302 to transmit SRB signaling, and UE 302 may transmit data of DRB(s) in grant-free resource pools. The configurations of grant-free resource pools are provided by base station 306 through broadcasting (e.g., system information) or in the random access configuration. In some implementations, the grant-free resource pools are periodical radio resources in time domain, for example, as illustrated in FIG. 4B. After UE 302 sends the RRC signaling in MSG3, UE302 may send the UL packet(s) in the latest grant-free resource pools. In some implementations, different grant-free resource pools may be configured in different BWP configurations. So, UE 302 may decide the grant-free resource pools, based on which the BWP configuration is selected, for MSG3 transmission/reception.

After base station 306 receives the data packet(s) from UE 302, in action 340, base station 306 may send MSG4 to UE 302, where MSG4 may include an RRC Response message (e.g., ACK/NACK message) to UE 302. In one implementation, MSG4 may also include an RRC suspend message, such that RRC Inactive UE 302 may perform uplink data packet transmission without transitioning to RRC Connected state, thereby reducing network signaling overhead and conserving radio resource. In another implementation, MSG4 may include a Random Access Response message having an RRC Resume message, which may cause UE 302 to transition from RRC Inactive state to RRC Connected state.

In FIGS. 3A and 3B, base station 306 may configure UE 302 in RRC Inactive state to realize the 2-step random access procedure or the 4-step random access procedure, respectively. In the 2-step random access procedure, UE 302 may send a UE-specific MSG1 (e.g., having a UE ID) to base station 306 based on a pre-configured random access configuration, such that base station 306 may identify UE 302 after receiving MSG1. In the 4-step random access procedure, UE 302 may send a UE ID (e.g., RRC Resume ID) in MSG3, such that base station 306 may identify UE 302 after receiving the RRC Resume Request message in MSG3.

Figure 3C:
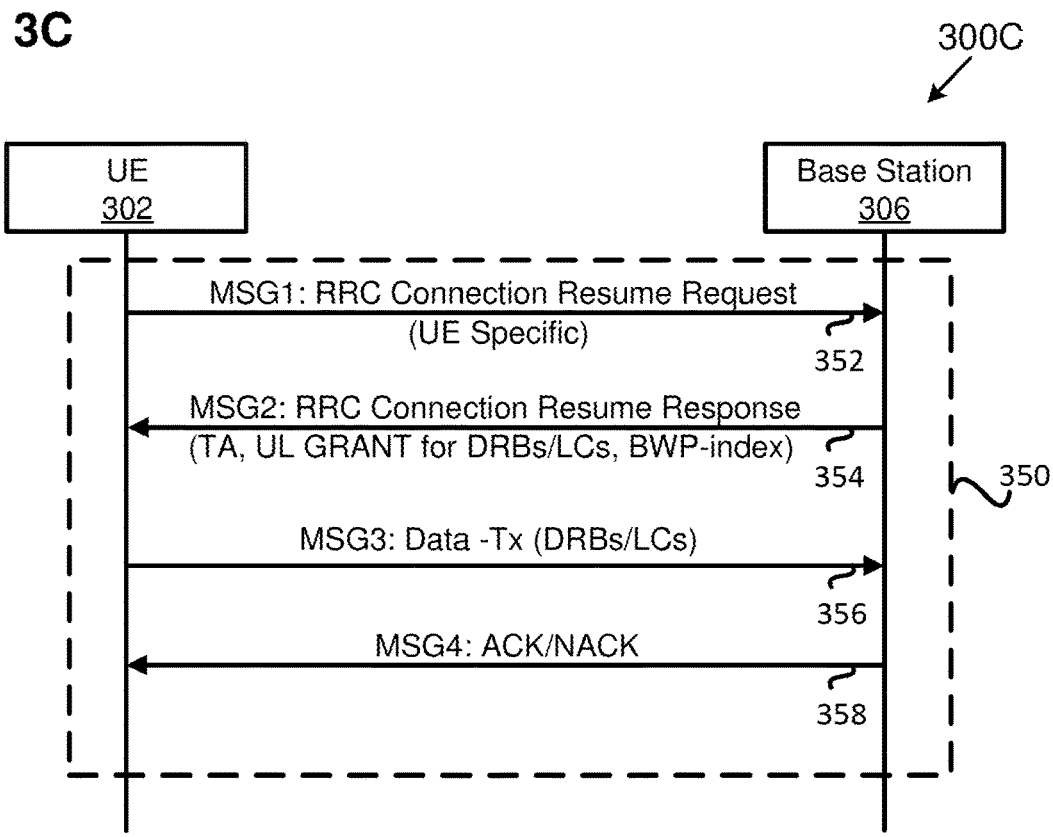
FIG. 3C is a diagram illustrating an uplink packet transmission from an RRC Inactive UE to a base station using another 4-step random access procedure, in accordance with an exemplary implementation of the present application.

FIG. 3C is a diagram illustrating an uplink packet transmission from an RRC Inactive UE to a base station using another 4-step random access procedure, in accordance with another exemplary implementation of the present application. In the present implementation, diagram 300C includes UE 302 and base station 306, where UE 302 may perform random access procedure 350 to transmit UL packet(s) to base station 306. Random access procedure 350 includes actions 352, 354, 356, and 358.

In action 352 of random access procedure 350, an RRC Inactive UE 302 may send MSG1 to base station 306 of a radio access network (e.g., RAN 204 in FIGS. 2A and 2B). MSG1 may include an RRC Connection Resume Request. In one implementation, the RRC Connection Resume Request may be a UE-specific preamble, which may be transmitted based on a pre-configured random access configuration, such that upon receiving the RRC Connection Resume Request, base station 306 may identify UE 302. In another implementation, the Preamble may include a UE ID, such that upon receiving the Preamble, base station 306 may identify UE 302.

In action 354, after base station 306 (and the associated RAN) receives the RRC Connection Resume Request, base station 306 may send MSG2 to UE 302. MSG2 may include an RRC Connection Resume Response message. In one implementation, MSG2 may provide time advance and resource grant for at least one Data Radio Bearer (DRB) or logical channel for UE 302 to deliver data packet(s) (e.g., small data packet(s)), for example, in MSG3. In one implementation, each DRB may be mapped to a corresponding logical channel in the pending packet scheduling, such that there is a one-to-one mapping relationship between a DRB and a logical channel. In one implementation, MSG2 may also include one or more bandwidth part (BWP) configuration indices, for example, corresponding to one or more pre-configured BWP configurations based on the pre-configured random access configuration. Based on the BWP indices from base station 306, UE 302 may apply the corresponding BWP configuration (e.g., pre-configured BWP configuration stored on UE 302) for the subsequent UL data packet transmission.

In addition, in action 356, UE 302 may transmit data packet(s) (e.g., small data packet(s)) on indicated resource grant (e.g., radio resources, such as DRBs and/or logical channels, granted by base station 306 in action 354).

After base station 306 receives the data packet(s) from UE 302, in action 358, base station 306 may send MSG4 to UE 302, where MSG4 may include ACK/NACK message to UE 302. In one implementation, MSG4 may also include an RRC suspend message, such that RRC Inactive UE 302 may perform uplink data packet transmission without transitioning to RRC Connected state, thereby reducing network signaling overhead and conserving radio resource. In another implementation, MSG4 may include an RRC Resume message, which may cause UE 302 to transition from RRC Inactive state to RRC Connected state.

It should be noted that, in FIGS. 3A, 3B, and 3C, base station 306 may not be the same base station that sent the pre-configured random access configuration to UE 302 in an RRC Connection Release message (e.g., RRC Connection Release message in action 212A/212B in FIG. 2A/2B), before UE 302 transitioned into RRC Inactive state. That is, once UE 302 transitions into RRC Inactive state, it may travel within a RAN-based notification area under the RAN, and perform random access procedure 330 with base station 306, which may not be the same base station that sent the RRC Connection Release message to UE 302 before UE 302 transitioned to RRC Inactive state.

As mentioned with reference to FIGS. 2A and 2B, a pre-configured random access configuration may be sent to a UE from a RAN before the UE transitions from RRC Connected state to RRC Inactive state, for example.

A pre-configured random access configuration may include at least one of the following objects:
(1) Bandwidth Part (BWP) configuration;
(2) Logical Cannel(s) (e.g., enabled to transmit packets through the random access procedure);
(3) UE Identity (e.g., RRC Resume ID);
(4) Time Pattern of Random Access;
(5) Access Control Parameters for the random access.

Table 1 shows parameters that can be included in a pre-configured random access configuration.

TABLE 1

Pre-Configured Random Access Configuration

| | Object | Description |
|---|---|---|
| (1) | Bandwidth Part (BWP) Configuration | Pre-configured BWP Configuration for UE(s) to apply during subsequent random access procedures. The Pre-configured BWP configuration may include at least one of the following parameters:<br>a) Numerology, which may include subcarrier spacing, cyclic-prefix length, etc.;<br>b) Bandwidth (e.g., in terms of physical Radio Blocks (PRBs));<br>c) Frequency location, which may be presented based on a common PRB index for a given numerology and an offset value between the BWP and a reference point. The offset value may be implicitly or explicitly indicated to the UE(s);<br>d) UL waveform: a base station may configure UL waveform (e.g., cyclic-prefix orthogonal frequency division multiplexing (CP-OFDM) or Discrete Fourier Transform-spread OFDM (DFT-s-OFDM)) which the UE(s) may apply in a random access procedure. |
| (2) | Logical Channel(s) (e.g., enabled to transmit packets through the random access procedure) | The base station may further indicate the logical channel(s) which pending packets may use to transmit through the random access procedure. In some implementations, the base station may indicate the logical channel(s) by indicating the logical channel identity (LCID) of these logical channels. In some other implementations, the base station may use an index to represent each logical channel. So, in this field, the base station may indicate the logical channel(s) by providing index(ices) to the UE.<br>In some implementations, a base station may configure a UE to repeat one pending packet for several times while the UE is filling the pending packet of one logical channel into the granted UL resource.<br>In some implementations:<br>(a) The base station may configure one logical channel with repetition number $R_K$. In the random access configuration, $R_k$ may be configured with LCID (e.g., $L_k$) or index(ices) of the logical channel(s).<br>(b) So, when the UE is transmitting one packet of $L_k$ (where this packet may occupy as many as $TB_k$ PRBs in the UL grant), the UE may repeat $TB_k$ as long as $R_k$ times. So, this pending packet may occupy as many as $TB_k * R_k$ PRBs.<br>(c) It is also worthy to note that the base station may configure different repetition values to different logical channels. |

TABLE 1-continued

Pre-Configured Random Access Configuration

| Object | Description |
|---|---|
| | (d) In some implementations, the value of $R_k$ is decided by the UE measuring the signal strengths of the serving base station. The base station may pre-configure the mapping rules between the coverage enhancement (CE) levels and the UE's measurement results (e.g., the RSRP (Reference Signal Received Power), RSRQ (Reference Signal Received Quality), RSSI (Received Signal Strength Indication), SINR (Signal to Interference plus Noise Ratio) of the serving base station), as shown in Table 2. Then, the UE may decide its CE level after measuring the base station's synchronization signals (e.g., synchronization signal block sets). Based on Table 2, the UE may decide the value of $R_k$. |
| (3) UE Identity (e.g., RRC Resume ID) | The base station may provide a UE ID to the UE. In some implementations, the UE may attach the UE ID in MSG1 (multiplexed with preamble) to the base station. So, the base station may recognize the UE after receiving MSG1. In some other implementations, the UE may attach the UE ID in MSG3 (in the RRC Connection Resume Request message) to the base station. As a result, the base station may recognize the UE after receiving MSG3. In some implementations, the base station may provide a specific dedicated random access resource (preamble and/or physical resource blocks). As a result, the base station may recognize the UE after the UE sends MSG1 on the given random access resource. |
| (4) Time pattern of random access | Parameters related to the time pattern between MSG1/MSG2/MSG3/MSG4. |
| (5) Access control parameters | $\{P_{ac}, D_{ac}, T_{ac}, L_{ac}, D'_{ac}\}$ for access control in RRC Inactivate state. In some implementations, logical-channel-specific values of $\{P_{ac}, T_{ac}, D_{ac}, L_{ac}, D'_{ac}\}$ may be configured to the UE. In some other implementations, the values of $\{P_{ac}, T_{ac}, D_{ac}, L_{ac}, D'_{ac}\}$ may be UE-specific. |

Table 2 shows exemplary mapping rules between CE levels and the values of packet repetition, where the mapping rules may be included in the random access configuration. $M_{cell}$ is a UE's measurement report, and $\{M_{cell}, Q_1 \sim Q_4\}$ may be RSRP, RSRQ, RSSI, SINR and so their units may be dB (for RSRP, RSRQ, SINR) or dBm (for RSSI).

TABLE 2

Mapping Rules between CE Levels
and Values of Packet Repetition

| CE level | Range | $R_k$ |
|---|---|---|
| CE#1 | $Q_1 < M_{cell} \leq Q_2$ | R1 (e.g., 5) |
| CE#2 | $Q_2 < M_{cell} \leq Q_3$ | R2 (e.g., 3) |
| CE#3 | $Q_3 < M_{cell} \leq Q_4$ | R3 (e.g., 2) |

A UE may implement a random access procedure based on stored pre-configured random access configuration(s). For example, in a random access procedure, a default BWP configuration and/or a pre-configured BWP configuration may be provided to the UE.

In some implementations, the UE may obtain the default BWP configuration through broadcast signal (e.g., system information) from a base station (e.g., gNB), and the pre-configured BWP configuration through the pre-configured random access configuration. In the beginning of a random access procedure, the UE may apply random access on the default BWP since the base station may not recognize the UE before the base station receives a UE-specific MSG1 or a UE ID in MSG3. As note that, in some other implementations, the UE may be configured with more than one pre-configured BWP configuration in the pre-configured random access configuration and each pre-configured BWP would have a BWP-index in the random access configuration.

After the base station identifies the UE (e.g., gNB receives UE identity in MSG1 (or MSG3), the base station may provide UL grant (e.g., in MSG2 or MSG4 transmission of a 4-step random access procedure) and control parameters (e.g., TA) based on the pre-configured BWP. Also note, in the implementations which more than one pre-configured BWP configuration is in the random access configuration, the base station may further indicate which pre-configured BWP configuration that the UE should apply in the subsequent random access procedure (e.g., by indicating a BWP index of the corresponding BWP configuration in MSG2 or MSG4 transmission of a 4-step random access procedure).

In addition, after the base station identifies the UE, the UE may apply the pre-configured BWP for subsequent message exchange with the base station.

In some other implementations, the UE may not be provided with pre-configured BWP in the pre-configured random access configuration. As such, the default BWP configuration, for example, broadcast by the base station through system information, may be applied for the entire random access procedure for the UE. In either a default or pre-configured BWP, the UE may apply random access procedure based on a configured numerology, a given frequency location, a UL waveform, and a bandwidth. The BWP configuration may affect the basic granularity of radio frame structure, such as the time/frequency span of one symbol, one slot, and one physical radio block, etc.

Figure 4A:
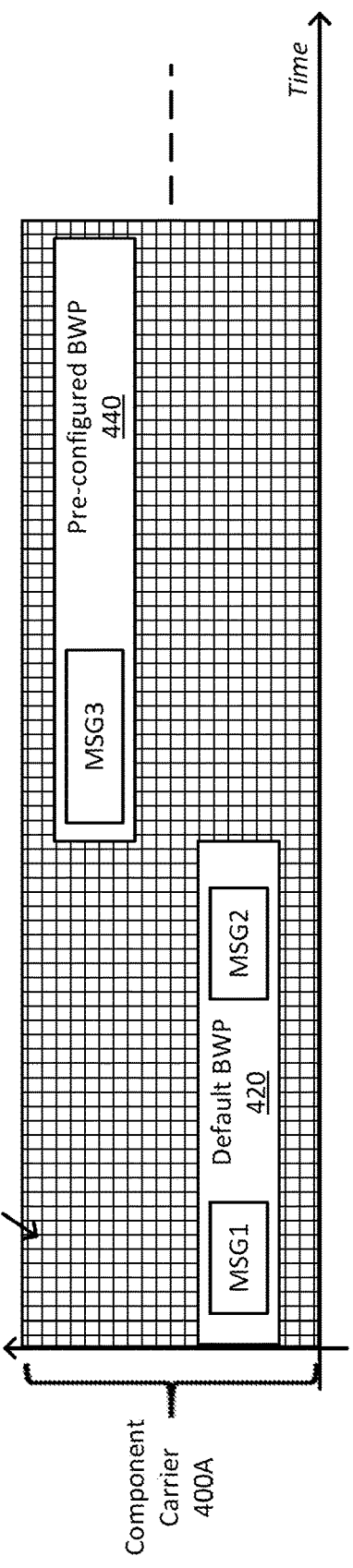
FIG. 4A shows a BWP configuration for a random access procedure, in accordance with an exemplary implementation of the present application.
Figure 4B:
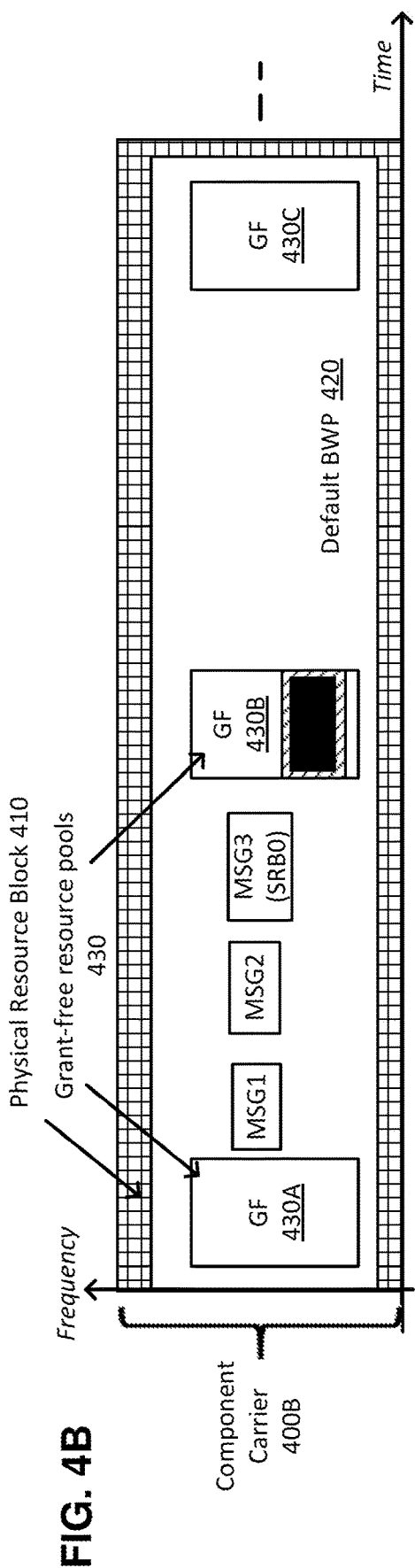
FIG. 4B shows a BWP configuration for a random access procedure, in accordance with another exemplary implementation of the present application.

FIG. 4A shows a BWP configuration for a random access procedure, in accordance with an exemplary implementation of the present application. As shown in FIG. 4A, component carrier 400A includes a plurality of physical resource blocks 410. A base station may broadcast a configuration of default BWP 420 as part of system information. The base station may also reserve pre-configured BWP 440 for data packet transmission.

A default BWP configuration is provided to a UE, for example, through system information broadcast by a base station. The UE and base station may exchange MSG1 and MSG2 using the default BWP configuration. If a pre-configured BWP configuration is provided to the UE through an RRC Connection Release message (e.g., in action 212A/212B in FIG. 2A/2B), then the UE may send MSG3 and data packet(s) using the pre-configured BWP configuration in the random access procedure, as shown in FIG. 4A.

As illustrated in FIG. 4A, MSG1 and MSG2 (e.g., in FIG. 3C) may each be transmitted using the configuration of default BWP 420, while MSG3 (e.g., in FIG. 3C) may be transmitted from the UE to the base station using the configuration of the pre-configured BWP 440.

In some implementations, a base station may only provide UL grant for UE to transmit SRB signaling, and the UE may transmit data of DRB(s) in grant-free resource pools. The configurations of grant-free resource pools are provided by the base station, for example, through broadcasting (e.g., system information) or in the random access configuration. In some implementations, the grant-free resource pools are periodical radio resources in time domain, for example, as illustrated in FIG. 4B. After the UE sends the RRC signaling in MSG3 (e.g., using SRB0), the UE may send the UL packet(s) in the latest grant-free resource pools. In some implementations, different grant-free resource pools may be configured in different BWP configurations. So, the UE may decide the grant-free resource pools, based on which the BWP configuration is selected, for MSG3 transmission/reception.

As illustrated in FIG. 4B, component carrier 400B includes a plurality of physical resource blocks 410, and a plurality of grant-free resource pools 430 having grant-free resource pools 430A, 430B, and 430c. A base station may broadcast the configuration of default BWP 420 as part of system information. As illustrated in FIG. 4B, MSG1, MSG2, and MSG3 (e.g., in FIG. 3B) may each be transmitted using the configuration of default BWP 420. Also, the UE may send the UL packet(s) in the latest grant-free resource pool (e.g., DRB #1 in grant-free resource pool 430B). In some implementations, grant-free resource pools 430A, 430B, and 430C may be configured in different BWP configurations. So, the UE may decide the grant-free resource pools, based on which the BWP configuration is selected, for MSG3 transmission/reception.

Figure 5:
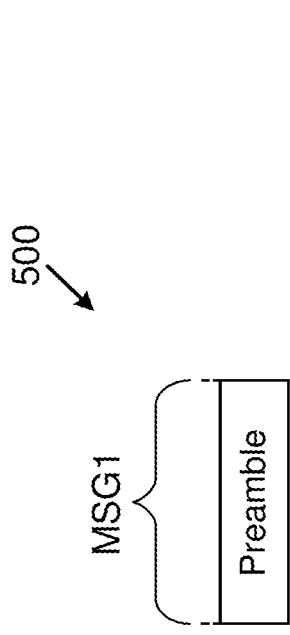
FIG. 5 illustrates a format of MSG1 of a random access procedure, in accordance with an exemplary implementation of the present application.

With reference to FIG. 3B, MSG1 in random access procedure 330 may include different contents for different implementations. In one implementation, as shown in diagram 500 of FIG. 5, MSG1 may include a preamble. As shown in diagram 600 of FIG. 6, MSG1 may include a preamble and an information element indicating the pending uplink data amount. As shown in diagram 700 of FIG. 7, MSG1 may include a preamble, a UE ID, and an information element indicating the pending uplink data amount.

In one implementation, in a 2-step random access procedure, MSG1 may include a pre-defined preamble. The UE identity may be shown by the pre-defined preamble and/or PRBs, which are pre-configured by RAN, before the UE transitioned into RRC Inactive state, for example, in a pre-configured random access configuration, such as the ones shown in FIGS. 2A and 2B. Thus, after receiving the pre-defined preamble delivered by the UE in the given PRBs, the base station is able to identify the UE after receiving MSG1.

In another implementation, in a 4-step random access procedure, a UE may not include a UE identity in MSG1, but may inform a base station about the amount of pending uplink data by preamble selection. The amount of pending uplink data may include the control signaling (e.g., RRC signaling) and UL data available for transmission plus MAC header and, where required, MAC control elements. In addition, the UL data available may be limited by the specific conditions of the logical channel(s), which is configured by the RAN in the random access configuration. In some implementations, the UE may calculate the amount of pending uplink data by jointly multiplying the number of repetition values for the pending packets.

Figure 8:
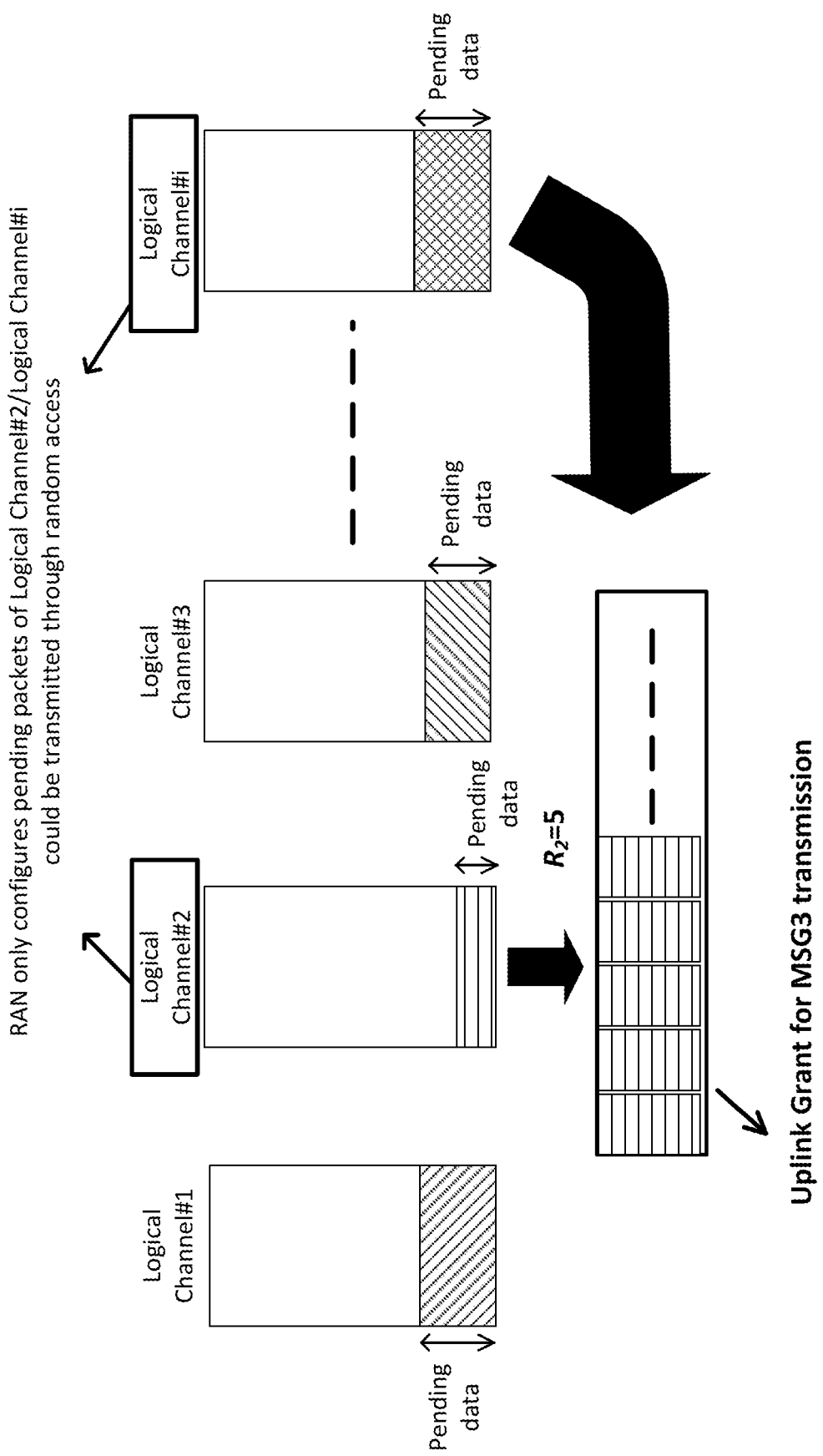
FIG. 8 is a diagram illustrating RAN-configured logical channels for pending packet transmission in a random access procedure, in accordance with an exemplary implementation of the present application.

FIG. 8 is a diagram illustrating RAN-configured logical channels for pending packet transmission in a random access procedure, in accordance with an exemplary implementation of the present application. As shown in FIG. 8, during the random access procedure, the UE may be allowed to transmit only the pending packets of the logical channels configured in the random access configuration. For example, in diagram 800, the RAN may only configure pending packets in Logic Channel #2 and/or Logic Channel # i to be transmitted through the random access procedure. As such, only the pending packets in Logic Channels #2 and # i may receive uplink grant for the subsequent transmission (e.g., in MSG3). Thus, when calculating the pending uplink data amount, the UE may only need to calculate the pending packets of the configured logical channels. By contrast, logical channels that are not configured by the RAN may not be included in the calculation of the pending uplink data amount.

In this approach, the UE may select a preamble based on the selection rules in Table 3. As shown in Table 3, all preambles may be further divided into several preamble groups. Each preamble group includes at least one preamble. The UE may first select a preamble group based on the calculated pending uplink data amount. Then, the UE may select a preamble from the selected preamble group, for example, autonomously. In Table 3, the unit of pending uplink data amount (D) and the thresholds $\{T_A, T_B, T_C \ldots T_J\}$ are represented by bytes.

TABLE 3

Selection Rules for UE to Select a Preamble Group Based on the Pending Uplink Data Amount to be Transmitted Through the Random Access Procedure

| Preamble group | Data amount (D) |
| --- | --- |
| PG#1 | $0 < D(\text{bytes}) \le T_A$ (bytes) |
| PG#2 | $T_B < D \le T_C$ |
| . . . | $T_I < D \le T_J$ |

In yet another implementation, in a 4-step random access procedure, a UE may select a preamble from many candidate preambles, for example, autonomously. The UE may send the selected preamble in MSG1 without conveying any additional information.

Figure 6:
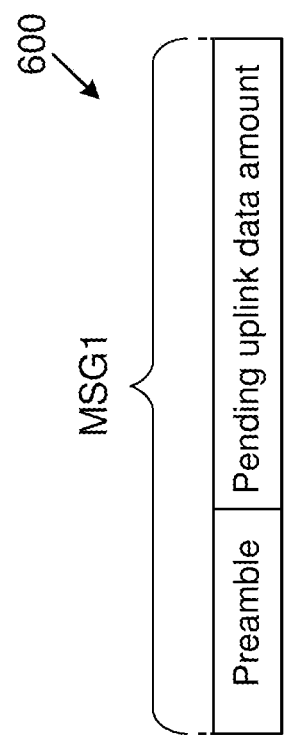
FIG. 6 illustrates a format of MSG1 of a random access procedure, in accordance with another exemplary implementation of the present application.

In yet another implementation, as shown in FIG. 6, MSG1, in diagram 600, may include a preamble and an information element indicating the amount of pending uplink data to be transmitted in the random access procedure. In one example, the UE may select the preamble autonomously without conveying additional information to the base station, for example, using a 4-step random access procedure. In another example, the preamble may be a UE-specific preamble pre-configured by the RAN, which may be delivered in one or more pre-configured PRBs, for example, using a 2-step random access procedure. As such, the base station is able to identify the UE after receiving MSG1.

As shown in FIG. 6, MSG1 includes the information element that indicates the pending uplink data amount. The mapping rules between the calculated data amount (D) and the information element is provided in Table 4.

TABLE 4

Mapping Rules between Calculated Pending Uplink
Data Amount and Pending Uplink Data Amount

| Pending Uplink Data Amount | Data Amount (D) |
| --- | --- |
| 0000 | $0 < D \text{ (bytes)} \leq T_a \text{ (bytes)}$ |
| 0001 | $T_b < D \leq T_c$ |
| ... | $T_i < D \leq T_j$ |
| 1000 | $T_m < D \leq T_n$ |

The UL data available may be limited by the specific conditions of the logical channel(s), which is configured by the RAN in the random access configuration. During the random access procedure, the UE may be allowed to transmit only the pending packets of the logical channels configured in the random access configuration. Thus, when calculating the pending uplink data amount, the UE may only need to calculate the pending packets of the configured logical channels, which are enabled by the base station to be transmitted through the random access procedure. By contrast, logical channels that are not configured by the RAN may not be included in the calculation of the pending uplink data amount. In Table 4, the unit of data amount (D) and the thresholds $\{T_a, T_b, T_c \ldots T_j\}$ are represented by bytes.

Figure 7:
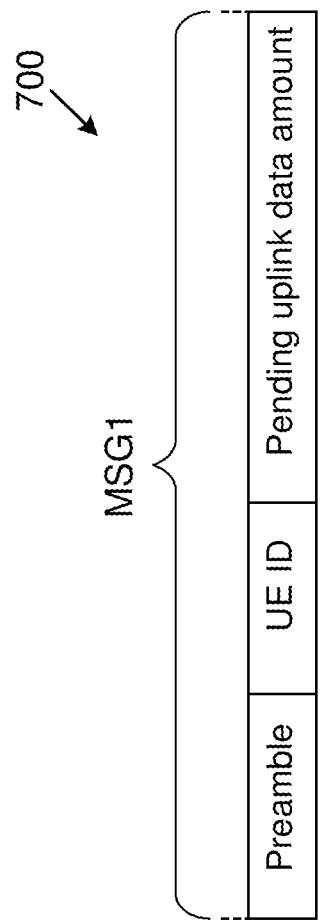
FIG. 7 illustrates a format of MSG1 of a random access procedure, in accordance with another exemplary implementation of the present application

In yet another implementation, as shown in FIG. 7, MSG1 may include a preamble, a UE ID and an information element indicating the amount of pending uplink data. In this implementation, the UE may select the preamble autonomously from all the candidate preambles. Then, the UE ID is provided in MSG1 so that the base station is able to identify the UE sending MSG1. The UE ID may be provided by the RAN in the pre-configured random access configuration. The information element indicating the pending uplink data amount is also included in MSG1 to inform the base station about the amount of pending uplink data. The amount of pending uplink data is calculated the same way as described above and the mapping rules between the calculated pending uplink data amount and the information element in MSG1 is the same as provided in Table 4.

It should be noted that in some implementations, MSG1 may be transmitted on the default BWP, for example, broadcast by a serving base station. In some other implementations, MSG1 may be transmitted on pre-configured BWP configured in the random access configuration. The default BWP configuration configured by the serving base station may have a higher priority, if the UE has both the default BWP configuration and the pre-configured BWP configuration from the random access configuration.

Referring back to FIG. 3B, in random access procedure 330, upon receiving MSG1 and recognizing the embedded information in MSG1 successfully (e.g., the base station recognizes the UE ID and/or the pending uplink data amount successfully, when such the information is embedded in MSG1), the base station may transmit MSG2 to the UE. MSG2 may include UL grant for MSG3 transmission and/or timing advance (TA).

In a situation where the base station obtains the pending uplink data amount after receiving MSG1 from the UE, the base station may provide uplink grant for the UE to transmit MSG3 based on the pending uplink data amount. Otherwise, the base station may provide a fixed amount of UL grant to the UE if the pending uplink data amount is not provided in MSG1. To the UE, the UE may know that MSG1 delivery (and the embedded information) is recognized by the base station after the UE receives MSG2 successfully. Then, the UE may prepare for MSG3 delivery based on the UL grant in MSG2. Otherwise, the UE may consider that MSG1 transmission to the base station has failed, for example, if the UE does not receive MSG2 within a predetermined time period after MSG1 transmission. In a 2-step random access procedure, the UE may transmit UL data packets on grant-free resource pools, which may be configured on random access configuration based on a pre-configured BWP configuration (if there is one). Otherwise, the grant-free resource pools may be provided through serving base station based on a default BWP configuration. In a 4-step random access procedure, the UL grant in MSG2 may be provided based on a default BWP configuration.

The base station may decide uplink TA for the UE to transmit MSG3 and the subsequent uplink message. In a 4-step random access procedure, the base station may decide the granularity of TA if the RAN has a pre-configured BWP configuration of MSG3 to the UE in the random access configuration. For example, the base station may decide the granularity of TA based on the subcarrier spacing of MSG3 transmission. Otherwise, the base station may indicate the UE's TA based on a default granularity (e.g., the default granularity decided based on the default BWP configuration).

In some implementations, MSG2 may be transmitted on the default BWP configured by the serving the base station (e.g., in a 2-step random access procedure). In some other implementations, MSG2 are transmitted on the configured-BWP configured in the random access configuration (e.g., in a 4-step random access procedure).

Referring back to FIG. 3B, in random access procedure 330, upon receiving MSG2 and recognizing the embedded information in MSG2 successfully (e.g., the UE recognizes the TA, UL grant successfully, when such the information is embedded in MSG2), the UE may transmit MSG3 to the base station.

The UE may transmit MSG3 based on BWP configuration, which may include numerology, UL waveform, bandwidth, and frequency location. In a 4-step random access procedure, the base station may identify the UE through MSG1 (e.g., as shown in FIG. 3B). So, if a pre-configured BWP configuration is included in the pre-configured random access configuration, the base station may provide UL grant based on this pre-configured BWP configuration. In the case which more than one pre-configured BWP configuration is in the random access configuration, the base station may further indicate which pre-configured BWP configuration that the UE should apply in the subsequent random access procedure (e.g., by indicating a BWP index of the corresponding BWP configuration in MSG2 or MSG4 transmission). So, the UE may implement the subsequent random access procedure (e.g., MSG3 transmission and MSG4 reception) based on the pre-configured BWP configuration.

In a 4-step random access procedure, the base station may recognize the UE after receiving MSG3 (e.g., as shown in FIG. 3B). So, the UL grant in MSG2 is provided based on the default BWP in the serving base station. The base station may provide the default BWP through broadcasting signal (e.g., system information). After the base station identifies the UE and sends RRC Connection Resume Response message, the base station may provide UL grant and provide DL signaling based on the configured BWP configuration in the random access configuration.

In some implementations, only one default BWP is applied to the random access procedure. In this condition, the UL grant is provided based on default BWP and the UE may transmit RRC Resume Request message and the following UL packets to the base station based on the default BWP directly. The base station may also decode MSG3 based on the default BWP configuration.

Figure 9:
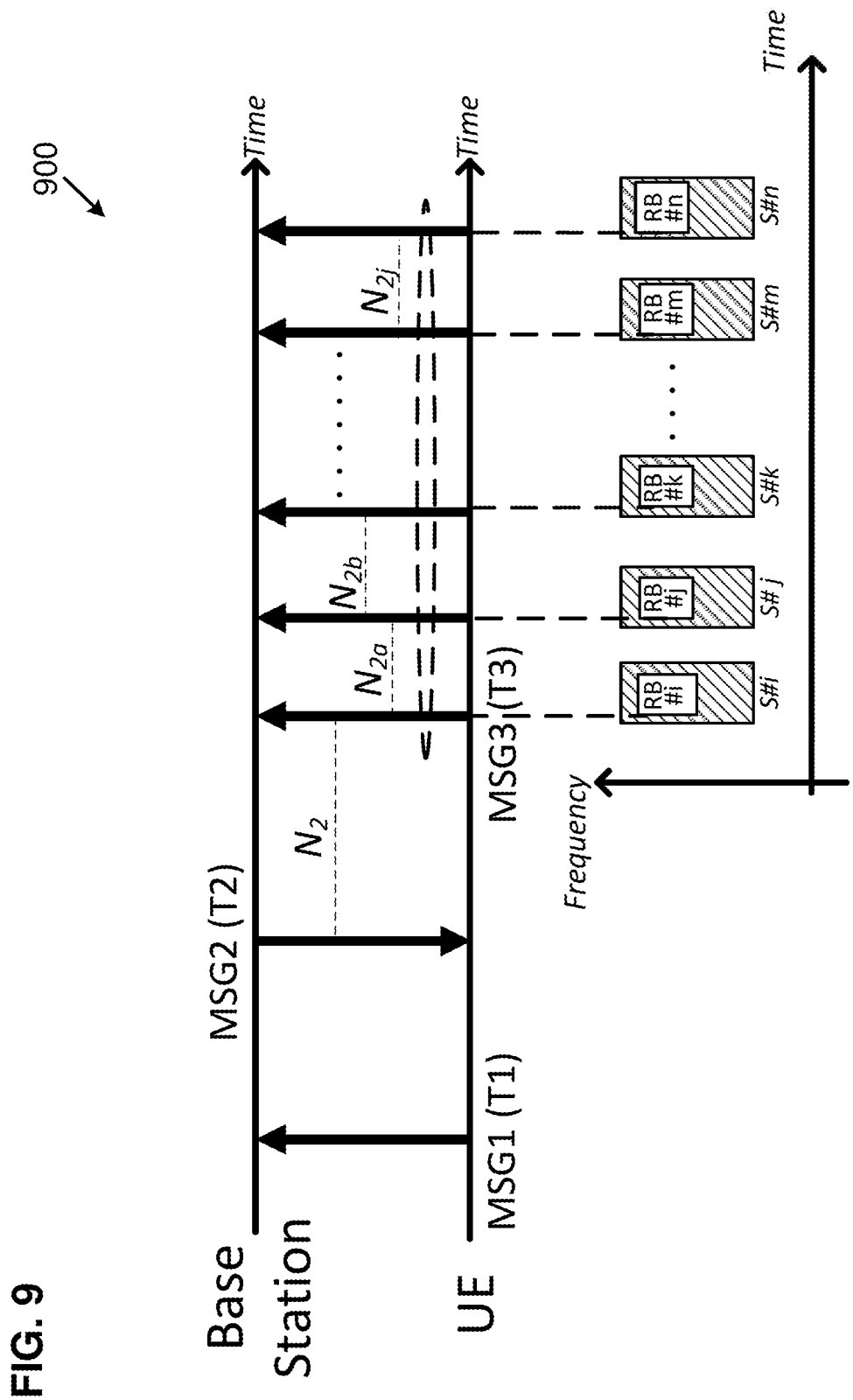
FIG. 9 is a diagram illustrating a base station providing UL grant spanning across multiple scheduling units in multiple slots or different number of symbols in time domain, in accordance with an exemplary implementation of the present application.

In MSG2, the base station may provide UL grant across multiple scheduling units. FIG. 9 is a diagram illustrating a base station providing UL grant spanning across multiple scheduling units in multiple slots or different number of symbols in time domain, in accordance with an exemplary implementation of the present application. As shown in FIG. 9, in diagram 900, {S # i, S # j, S # k, . . . S # m, and S # n} are scheduling units (e.g., configured by MSG2), which may be contiguous or non-contiguous in time domain. {$N_{2a}$, $N_{2b}$, . . . $N_{2j}$} are waiting time period between the scheduling units. The granularity of scheduling unit in time domain and the waiting time periods may be symbol, slot, or subframe. It is noted that the values of {S # i, S # j, S # k, . . . S # m, and S # n} may also be different. Similarly, the values of {$N_{2a}$, $N_{2b}$, . . . $N_{2j}$} may also be different. The UE obtains the scheduling unit information and waiting time period based on the obtained UL grant and BWP configuration from random access configuration or from the serving the base station. As such, the UE may decide the exactly timing of these granted PRBs and prepare MSG3 transmission.

In the random access configuration, the UE decides the MSG3 transmission by considering the logical channels that are allowed to transmit data through the random access procedure. In addition, the UE may also repeat each packet if a repetition value is configured with the logical channel. In some other implementations, the UE may decide the value of packet repetition by the measurement results of the serving base station.

In each RB, the UE may add a one-bit indicator (e.g., one-bit end of transmission ("EoT") bit) to indicate the end of transmission or to indicate continuation to the next RB transmission. Therefore, in some implementations, the UE may set EoT=0 if there are still some pending packets.

When the base station receives a packet having EoT=0 from the UE, in one implementation, the base station may allocate additional UL grant resource(s) to the UE for the subsequent UL packet transmission, if the UE needs more radio resource to finish UL packet transmission. The base station may allocate additional UL grant to the UE with the ACK message and RRC Connection Resume Response message in MSG4.

When the base station receives a packet having EoT=0 from the UE, in another implementation, the base station may require the UE to transition to RRC Connected state, instead of staying RRC Inactive state, for the subsequent packet transmission. The UE may set EoT=1 when transmitting the last pending packet to the base station. Then, the base station may send an RRC Suspend message to let the UE transition back to RRC INACTIVE state and disconnect with the base station. If there are remaining PRBs which are not used by the UE, the base station may schedule the un-used PRBs may for other UEs.

It should be noted that, the UE may not transmit the EoT bit with a UL packet if the base station disables the continuous RB transmissions in MSG3.

Referring back to FIG. 3B, in random access procedure 330, after transmitting MSG3, the UE may wait for the reception of MSG4. In MSG4, the base station may send an RRC Resume Response, and an acknowledgement/non-acknowledgement (ACK/NACK) message for the packet(s) transmitted in MSG3. In some implementations, the base station may further provide UL grant to the UE, if the UE still has pending data to be transmitted. It is noted that the UL grant provided after RRC Connection Resume Response may be configured based on the configured BWP in the random access configuration, when the configured BWP is available.

Figure 10:
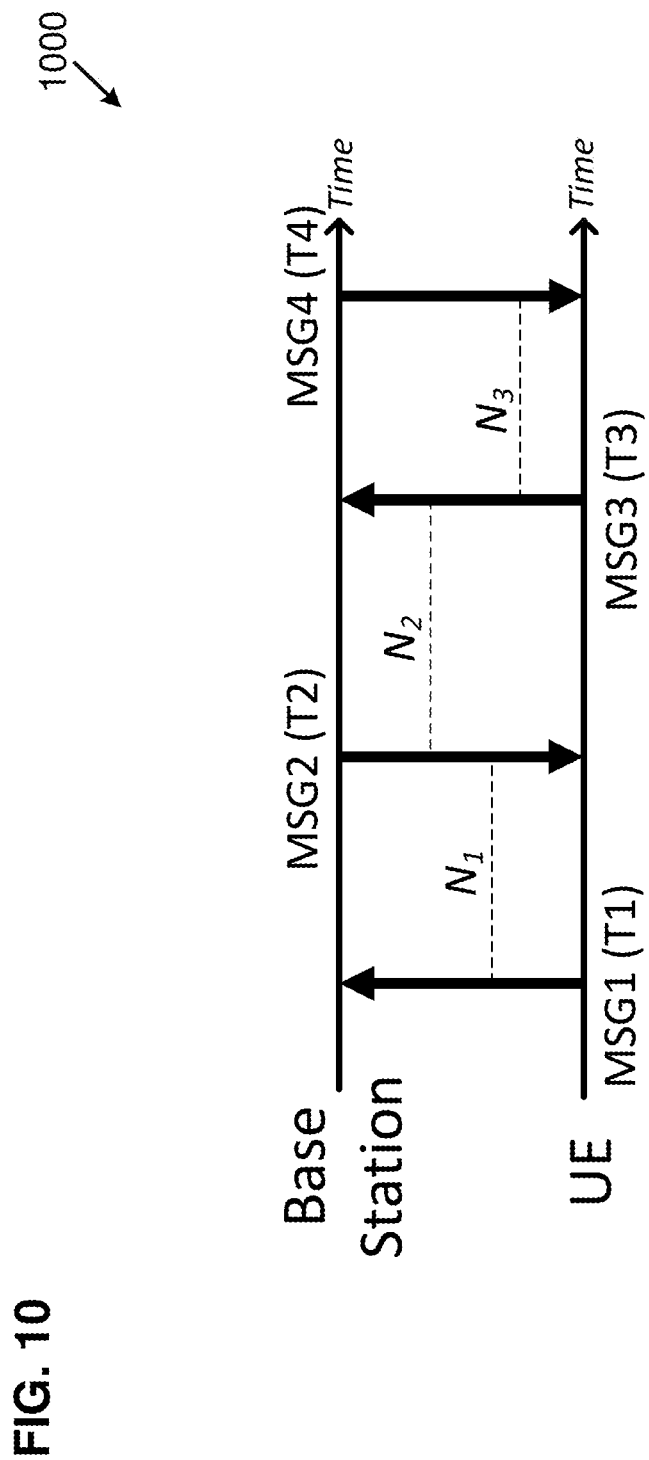
FIG. 10 is diagram showing a time pattern decision in a random access procedure, in accordance with an exemplary implementation of the present application.

Referring now to FIG. 10, FIG. 10 is diagram showing a time pattern decision for a random access procedure, in accordance with an exemplary implementation of the present application. In one implementation, a base station may configure a time pattern for the UE to implement the random access procedure. As shown in FIG. 10, $N_1$, $N_2$ and $N_3$ represent gaps between different message deliveries in the time domain.

In diagram 1000 of FIG. 10, $N_1$ represents the maximum waiting time period between the transmission of MSG1 and the reception of MSG2 on the UE side. For example, the base station may transmit MSG2 no later than $N_1$ after the base station receives MSG1. The UE may consider MSG1 transmission failed if the UE does not receive MSG2 when the UE has been waiting for longer than $N_1$ duration after the transmission of MSG1.

In some implementations, $N_1$ may be pre-configured by the base station (e.g., in the pre-configured random access configuration) before the random access procedure, and so the value of $N_1$ may be UE-specific. As such, the base station may identify UE after receiving MSG1 and knows the time limit for transmitting MSG2.

In some implementations, the value of $N_1$ may be a fixed value in the technical specification or may be conducted by receiving broadcasted signaling (e.g., system information) from the base station. For example, the system information may indicate the default numerology for the random access procedure. A default BWP (and so a default numerology) may include sub-carrier-spacing, cyclic-prefix length, and etc. Thus, the default BWP configuration may affect the value of symbols and slots in the frame structure. In addition, the granularity of $N_1$ may be one or multiple symbols (e.g., 1-7 symbols in time domain), one or multiple time slots, or one or multiple subframes.

It is also noted that the design of $N_1$ can be generally applied to both the 2-step and 4-step random access procedures.

Figure 11:
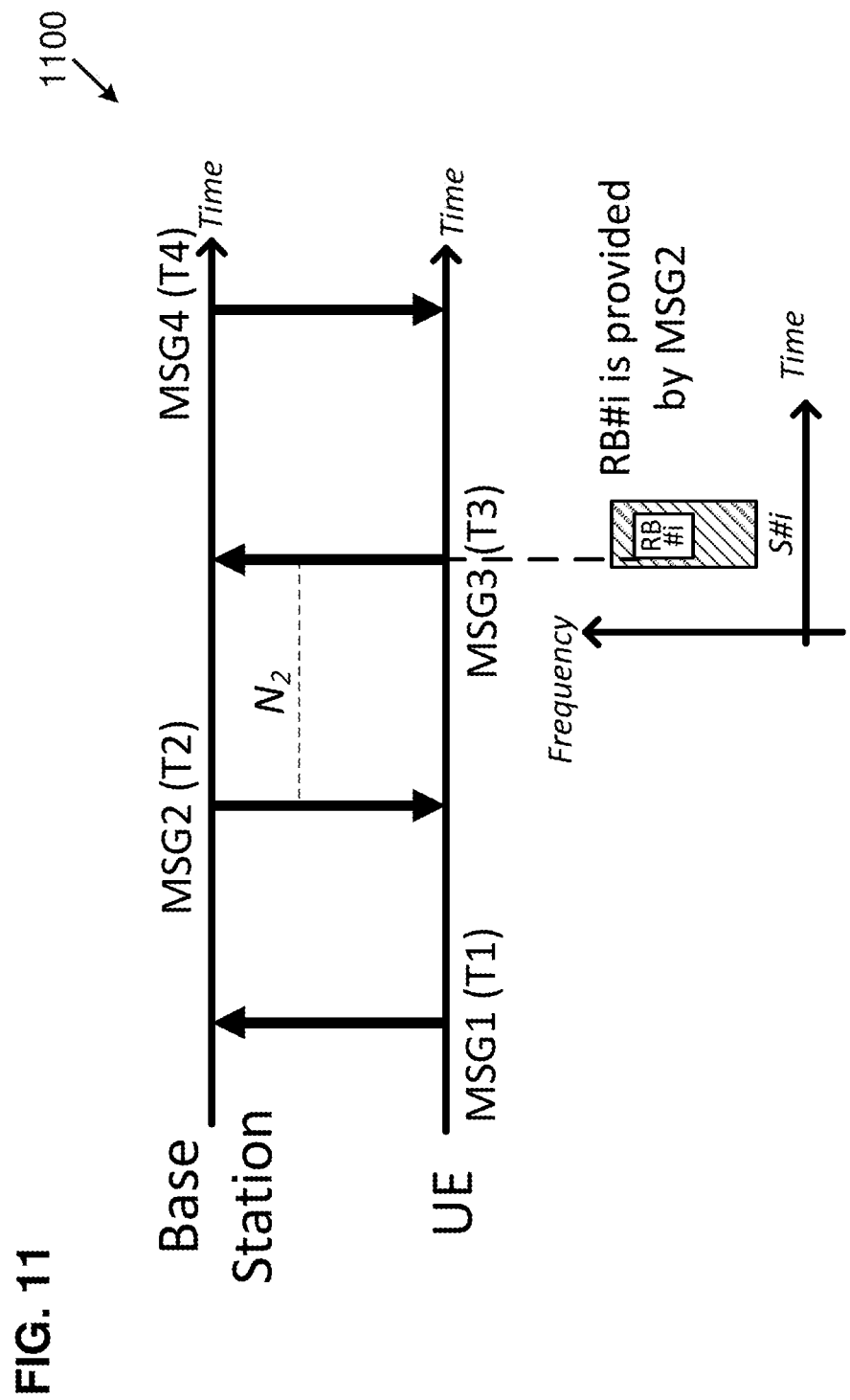
FIG. 11 is diagram showing a time pattern decision for MSG3 based on UL grant in MSG2 in a random access procedure, in accordance with an exemplary implementation of the present application.

In diagram 1000 of FIG. 10, $N_2$ represents the waiting time period between the reception of MSG2 and the transmission of MSG3. In some implementations, the value of $N_2$ may be a fixed value, which may be provided by MSG2 in the uplink grant. After receiving MSG2, the UE may know when and in which Physical Resource Blocks to transmit MSG3, for example, based on the UL grant in MSG2, as shown in FIG. 10. In the present implementation, the value of $N_2$ can be one or more symbols (e.g., 1-7 symbols), one or more time slots, or one or more subframes. FIG. 11 is a diagram showing a time pattern decision for MSG3 based on UL grant in MSG2 in a random access procedure, in accordance with an exemplary implementation of the present application. In diagram 1100, a UE determines when to transmit MSG3 based on UL grant received in MSG2.

In some implementations, there is a group of uplink messages in MSG3. As described above with reference to FIG. 9, the base station provides UL grant to UE through MSG2. In FIG. 9, the base station may configure multiple PRBs {RB # i, RB # j, RB # k, . . . RB # m, RB # n} in the uplink grant. So, based on the given uplink grant, the UE may understand the value of {$N_2$, $N_{2a}$, $N_{2b}$, . . . $N_{2j}$}, which may be one or more symbols (e.g., 1-7 symbols), one or more time slots, or one or more subframes. It is also noted that {S # i, S # j, S # k, S # m, S # n} are scheduling units configured by MSG2 and the scheduling units may be contiguous or non-contiguous in time domain.

In some implementations, the base station may configure multiple RBs for the UE based on a slot aggregation approach. As such, the scheduling units {S # i, S # j, S # k, . . . S # m, S # n} are contiguous to each other. In addition, the value of each of {$N_{2a}$, $N_{2b}$, . . . $N_{2j}$} is equivalent to the time duration of one time slot.

In diagram 1000 of FIG. 10, $N_3$ represents the waiting time period between the transmission of MSG3 (e.g., the last RB of MSG3) and the reception of MSG4 on the UE side. The value of $N_3$ may be one or more symbols (e.g., 1-7 symbols), one or more time slots, or one or more subframes. The value of $N_3$ may be affected by the BWP configuration, which may be the default BWP or pre-configured BWP.

In a 4-step random access procedure, $N_1$, $N_2$, and $N_3$ may be pre-configured by the base station (e.g., through dedicated signaling, such as RRC signaling) in the random access configuration. The value of each of $N_1$, $N_2$, and $N_3$ may be UE-specific. The base station may identify the UE after receiving MSG1. As such, the base station knows the values of $N_1$, $N_2$, and $N_3$ since they are pre-configured. In another 4-step random access procedure, the values of $N_1$, $N_2$, and $N_3$ may be fixed, and be decided by a default BWP configuration.

A base station may configure RRC Inactive state access control parameters in the random access configuration. To prevent congestion of random access resource, the base station may configure a prohibit timer to an UE transitioning to RRC Inactive state. The UE in RRC Inactive state may activate the prohibit timer, $P_{ac}$, (e.g., having a unit: second/millisecond), when the base station sends an RRC Response message (e.g., RRC Suspend message to the UE) to finish a random access procedure. The UE may not be allowed to trigger a random access procedure just for another UL packet transmission (as shown in FIG. 1) until the $P_{ac}$ expires. The value of $P_{ac}$ may be UE-specific or logical channel-specific.

In some other implementations, a threshold data amount, $D_{ac}$, (unit: bytes) is provided to prevent congestion of random access resource. Based on the FIG. 8, the UE may calculate the amount of pending packets of (Logical Channel #2, Logical Channel # i). The influence of repetition may or may not be included in the pending packet calculation. The UE may be allowed to trigger a random access procedure for packet transmission only after the amount of pending packets exceeds the threshold data amount, $D_{ac}$. Otherwise, the UE is not allowed to trigger a random access procedure for packet transmission. The value of $D_{ac}$ may be UE-specific or logical channel-specific.

In some other implementations, the base station will provide a threshold ($T_{ac}$). An RRC Inactive UE may generate a random value within a pre-defined range. For example, the UE may randomly select a value within the range (0,1), where (0,1) is pre-defined by the RAN. Then, the UE may compare with the random value with the threshold, $T_{ac}$. In one implementation, the UE may be allowed to trigger a random access procedure for UL packet transmission, if the random value is higher than the $T_{ac}$. Otherwise, the UE may re-activate the prohibit timer, $P_{ac}$, and re-generate another random value to compare with the threshold, $T_{ac}$, after the prohibit timer expires. In another implementation, the UE may be allowed to trigger a random access procedure for UL packet transmission, if the random value is lower than (or equal to) the $T_{ac}$. The value of $T_{ac}$ may be UE-specific or logical channel-specific.

In yet some other implementations, the transmission latency of UL packets may be more critical. Thus, the base station may configure the latency threshold, $L_{ac}$, for an RRC Inactive UE. Thus, the RRC Inactive UE may establish an RRC connection with the base station, when the waiting time of the UL packets in the UE's buffer is longer than the configured latency threshold, $L_{ac}$. The value of $L_{ac}$ may be UE-specific or logical channel specific, which means different logical channels may be provided with different priorities. Thus, the base station may provide different $L_{ac}$ values in the random access configuration for different logical channels.

In yet some other implementations, another threshold data amount, $D'_{ac}$ (unit: bytes) may also be configured to the UE. The UE may establish an RRC connection for packet transmission if the amount of pending packet is higher than $D'_{ac}$ and if UE can't transmit pending packets successfully through random access procedure. The value of $D'_{ac}$ may be UE-specific or logical channel-specific.

Figure 12:
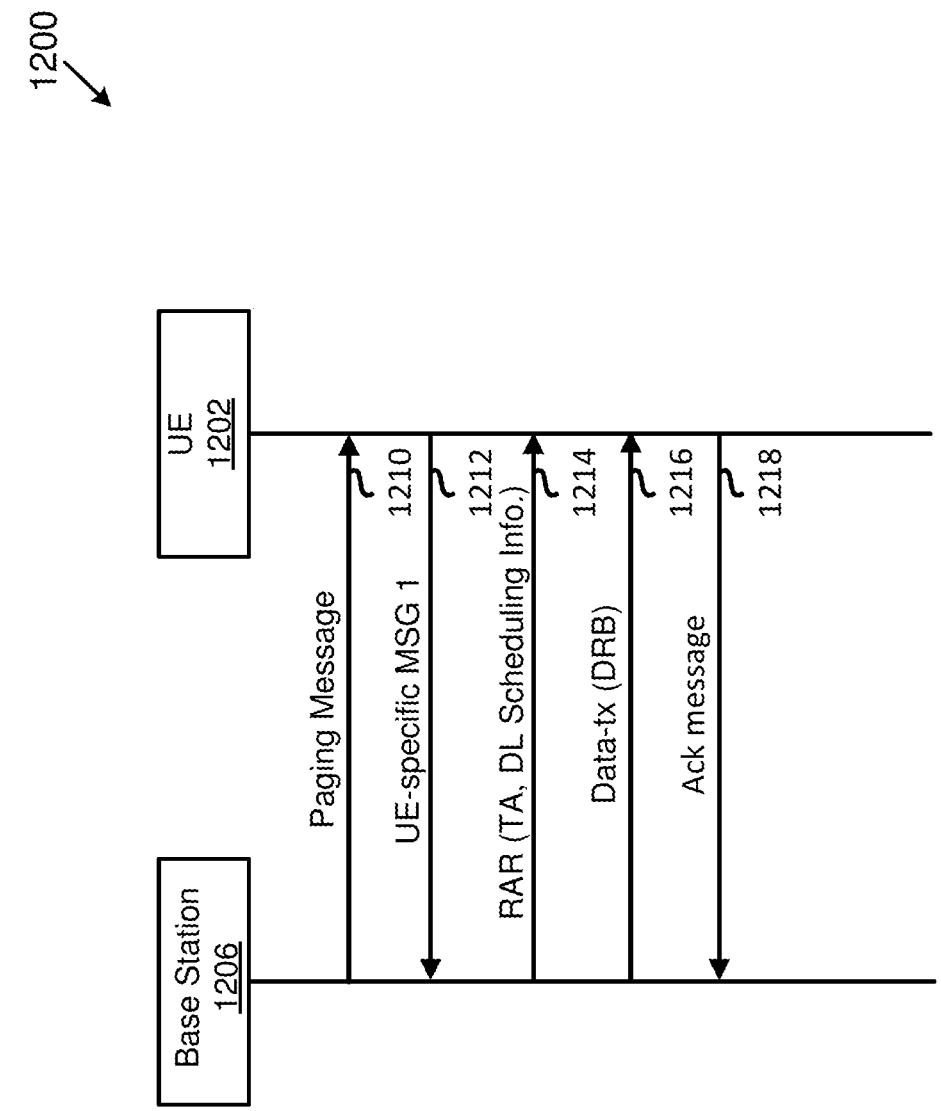
FIG. 12 is a diagram illustrating a downlink packet transmission from a base station to an RRC Inactive UE using a random access procedure, in accordance with an exemplary implementation of the present application.

In some implementations, a base station may deliver downlink (DL) packets (e.g., DL small packets) to UEs in RRC Inactive state. FIG. 12 is a diagram illustrating a downlink packet transmission from a base station to an RRC Inactive UE using a random access procedure, in accordance with an exemplary implementation of the present application.

Base station 1206 may configure a specific UE ID, which is provided for DL packet transmission, to UE 1202. In some implementations, the specific UE ID may be the RRC Resume ID (or truncated RRC Resume ID). Moreover, base station 1206 may also configure a UE-specific MSG1 for DL small data transmission. Both the specific UE ID and the UE-specific MSG1 may be configured in the RRC state configuration message.

Base station 1206 may inform, by delivering the specific UE ID of the UE 1202 in the paging message, in action 1210, UE 1202 at RRC Inactive state to perform DL packet transmission. In this implementation, UE 1202 may not transition to an RRC Connected state for performing the DL packet transmission. Then, in action 1212, UE 1202 may deliver the UE-specific MSG1 to base station 1206, which allows base station 1206 to identify UE 1202 by the UE-specific MSG1.

In some implementations, base station 1206 may provide one-bit indicator (e.g., by setting the indicator to 1) in the paging message to UE 1202, which allows UE 1202 to perform DL packet transmission without transiting to RRC Connected state and to send the UE-specific MSG1 after receiving the paging message.

In action 1214, base station 1206 may deliver a RAR response, containing timing advance information, DL scheduling information for DL packet transmissions, and UL resource grant for UE 1202 to send ACK/NACK message to base station 1206. UE 1202 may decode the RAR message in response to the information in the paging message (e.g., a gNB pages UE 1202 based on a UE-specific ID/RRC Resume ID or one-bit indicator to inform UE 1202 to receive the RAR response for DL packet transmission). In action 1216, UE 1202 may receive the DL packets directly. After DL packet transmission is completed, UE 1202 may send ACK/NACK messages to base station 1206 in action 1218. In the DL scheduling information, base station 1206 may further indicate which pre-configured BWP configuration (e.g., through BWP-index if there are more than one pre-configured BWP configurations) would be applied for the following DL packet transmission. Otherwise, the following DL packet transmission would be transmitted based on default BWP.

Therefore, in order to enable the DL packet transmission for UEs in RRC Inactive state, the base station may need to configure a UE-specific ID/UE-specific MSG1 for DL packet transmission. Thus, when the UE finds the configured UE-specific ID in the paging message, the UE will stop doing state transition for the following DL packet transmission. Moreover, the base station may configure the UE with another UE-specific ID in the RRC state configuration message. Therefore, the UE may require RRC Connection establishment or RRC Connection Resume Request after receiving the specific ID in paging message. In some other implementations, the eNB may provide an indicator (e.g., one bit) to indicate the UE to implement RRC Connection establishment (e.g., indicator is set to 0) or RRC Connection Resume Request or DL packet reception (e.g., indicator is set to 1).

As shown in FIG. 13A, in diagram 1300A, base station 1306 may deliver an RRC State Configuration message to UE 1302 in action 1310. The base station 1306 may configure whether RRC Inactive state is enabled to UE 1302 and the relative parameters/state transitions for UE 1302 in the RRC state configuration message. The RRC state configuration message includes an explicit RRC message (e.g., an RRC Connection Reconfiguration message, an RRC Connection release message or a new RRC message) or a MAC Control Element (MAC CE).

Based on implementations of the present application, a base station may determine a UE's RRC state through following inputs: (a) input from the core network; (b) input from the UE; (c) self-observation from the base station.

(a) Input from the Core Network (CN)

In some implementations, a base station determines a UE's RRC state in response to the input, (e.g., network slice instances), from the CN. The CN may deliver the network slice instance information of the UE to the base station. Then, the base station may configure the UE's RRC states in response to the received network slice instance of the UE.

In one implementation, the base station may configure RRC Connected state or RRC Idle state to the UE, for example, when eMBB network slice instance is generated to UE. In another implementation, the base station may configure RRC Connected state/RRC Idle state/RRC Inactive state to the UE, for example, when URLLC network slice instance is generated to the UE. In another implementation, the base station may configure an RRC Connected state, an RRC Idle state, or an RRC Inactive state to the UE when mMTC network slice instance is generated to the UE.

Thus, a base station may configure an RRC Connected state, an RRC Idle state, or an RRC Inactive state to a UE including an mMTC network slice instance. In contrast, the network may only configure an RRC Connected state or an RRC Idle state to a UE including an eMBB network slice instance.

Moreover, a UE may be configured with multiple network slice instances. In one implementation, the network may consider the RRC state configuration of the UE by jointly considering the UE' network slice instances. For example, the UE may be configured with an eMBB network slice instance and a mMTC network slice instance. Therefore, the network may still configure an RRC Connected state, an RRC Idle state, or an RRC Inactive state to UE 1302 configured with the eMBB and the mMTC network slice instances respectively.

(b) Input from the UE

In some implementations, a UE may have specific preferences including UE's needs for data rate boost, short latency, and/or power lifetime extension. Thus, the UE may send an RRC Inactive state request to the base station which indicates whether the UE requires RRC Inactive state and cause events including data rate boost, short latency, or power lifetime extension, etc. The RRC Inactive state request may be an explicit RRC message (e.g., an RRC Connection reconfiguration message, an RRC Connection Release message or a new RRC message) or a MAC Control element (MAC CE). In some implementations, the RRC Inactive state request may be included in a UE Capability Information message sent to the base station. As shown in FIG. 13B, in diagram 1300B, UE 1302 may send an RRC Inactive State Request to base station 1306 in action 1312.

(c) Self-Observation from the Base Station

A base station may configure RRC states in response to traffic characteristics (e.g., inter-arrival time of packets, traffic volume, UE's mobility state, UE speed, etc.) of a UE. In some implementations, the RRC state configuration message may be a cell-specific control signaling. In one implementation, the base station may deliver the RRC state configuration message to the UE during a handover process. In another implementation, a base station may broadcast an RRC state configuration message (e.g., through system information, Physical Downlink Control Channel, or Enhanced Physical Downlink Control Channel).

In some implementations, a base station is able to configure the RRC states of a UE. In one implementation, a base station may explicitly indicate the enabled RRC states to the UE through an RRC state configuration message including an RRC Connected state, an RRC Idle state, or an RRC Inactive state.

In another implementation, an RRC Connected state, an RRC Idle state, or an RRC Inactive state are installed in the software modules of a UE. Then, a base station may deliver the RRC state configuration message to the UE to disable the RRC Inactive state transition of the UE. As such, after receiving the RRC state configuration message, the UE may disable RRC Inactive state. In contrast, the base station may also deliver the RRC state configuration message to enable the state transition about RRC Inactive state if RRC Inactive state is disabled by the network previously. If RRC Inactive state is disabled by default, the base station needs to deliver an RRC state configuration message to enable RRC Inactive state. Moreover, the UE may fallback to default RRC states when the UE reboots. Thus, the base station may need to deliver an RRC state configuration message to the UE during an initial access process.

Figure 14:
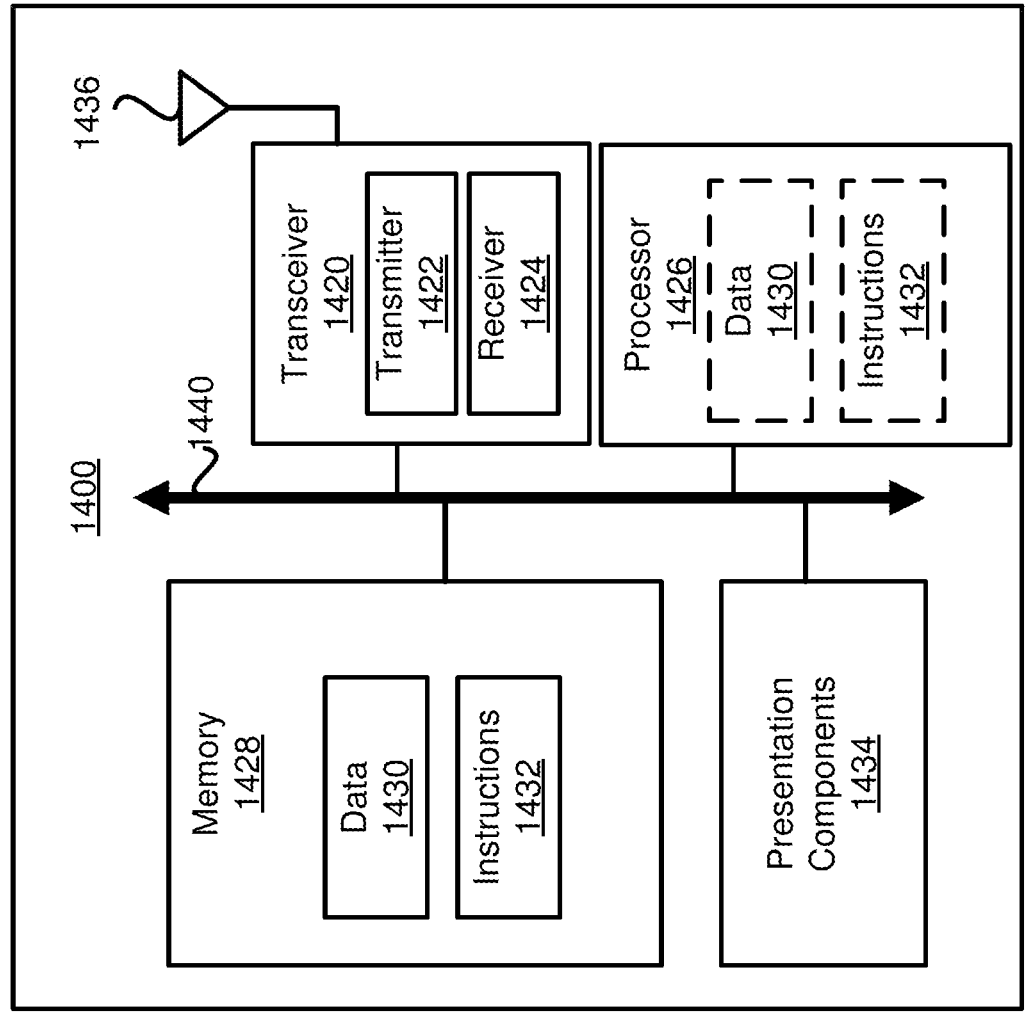
FIG. 14 illustrates a block diagram of a node for wireless communication, in accordance with various aspects of the present application.

FIG. 14 illustrates a block diagram of a node for wireless communication, in accordance with various aspects of the present application. As shown in FIG. 14, node 1400 may include transceiver 1420, processor 1426, memory 1428, one or more presentation components 1434, and at least one antenna 1436. Node 1400 may also include an RF spectrum band module, a base station communications module, a network communications module, and a system communications management module, input/output (I/O) ports, I/O components, and power supply (not explicitly shown in FIG. 14). Each of these components may be in communication with each other, directly or indirectly, over one or more buses 1440.

Transceiver 1420 having transmitter 1422 and receiver 1424 may be configured to transmit and/or receive time and/or frequency resource partitioning information. In some implementations, transceiver 1420 may be configured to transmit in different types of subframes and slots including, but not limited to, usable, non-usable and flexibly usable subframes and slot formats. Transceiver 1420 may be configured to receive data and control channels.

Node 1400 may include a variety of computer-readable media. Computer-readable media can be any available media that can be accessed by node 1400 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1428 may include computer-storage media in the form of volatile and/or non-volatile memory. Memory 1428 may be removable, non-removable, or a combination thereof. Exemplary memory includes solid-state memory, hard drives, optical-disc drives, and etc. As illustrated in FIG. 14, memory 1428 may store computer-readable, computer-executable instructions 1432 (e.g., software codes) that are configured to, when executed, cause processor 1426 to perform various functions described herein, for example, with reference to FIGS. 1A through 13B. Alternatively, instructions 1432 may not be directly executable by processor 1426 but be configured to cause node 1400 (e.g., when compiled and executed) to perform various functions described herein.

Processor 1426 may include an intelligent hardware device, e.g., a central processing unit (CPU), a microcontroller, an ASIC, and etc. Processor 1426 may include memory. Processor 1426 may process data 1430 and instructions 1432 received from memory 1428, and information through transceiver 1420, the base band communications module, and/or the network communications module. Processor 1426 may also process information to be sent to transceiver 1420 for transmission through antenna 1436, to the network communications module for transmission to a core network.

One or more presentation components 1434 presents data indications to a person or other device. Exemplary one or more presentation components 1434 include a display device, speaker, printing component, vibrating component, and etc.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method performed by a User Equipment (UE) for wireless communication, the method comprising:
    initiating, by the UE, a random access (RA) procedure for transmitting data to a base station based on comparing an amount of the data with a first threshold configured to the UE;
    transmitting, by the UE in a Radio Resource Control (RRC) Inactive (RRC_Inactive) state, at least one packet of the data to the base station using the RA procedure;
    receiving, by the UE in the RRC_Inactive state, an acknowledgement or non-acknowledgement (ACK/NACK) message from the base station in response to the at least one packet transmitted by the UE; and
    initiating, by the UE, an RRC Resume procedure to transition from the RRC_Inactive state to an RRC Connected (RRC_Connected) state and transmit pending packets of the data in the RRC_Connected state when at least one of (i) the amount of the data is higher than a second threshold configured to the UE and (ii) the pending packets are not transmittable using the RA procedure, wherein the UE initiates the RRC Resume procedure without receiving an instruction from the base station to initiate the RRC Resume procedure.

2. The method of claim 1, wherein the ACK/NACK message includes an instruction to the UE to stay in the RRC_Inactive state.

3. The method of claim 1, further comprising:
    transmitting, by the UE, a random access preamble to the base station,
    wherein the random access preamble is associated with random access resources including time and/or frequency radio resources that are reserved for a plurality of UEs by the base station for data transmission.

4. The method of claim 1, further comprising:
providing, by the UE, capability information to the base station, the capability information indicating whether the UE supports operations in the RRC_Inactive state.

5. The method of claim 1, further comprising:
receiving, by the UE, a pre-configured random access configuration in an RRC configuration message; and
applying, by the UE, the pre-configured random access configuration in the random access procedure to transmit the at least one packet to the base station,
wherein the pre-configured random access configuration comprises at least one of a pre-configured bandwidth part (BWP) configuration, a plurality of access control parameters, a UE identifier (ID), and a time pattern of random access.

6. The method of claim 5, wherein one of the plurality of access control parameters comprises a parameter indicating the amount of the data.

7. The method of claim 1, wherein the at least one packet includes an indicator indicating whether a second packet is pending for transmission from the UE to the base station.

8. The method of claim 7, further comprising:
receiving, by the UE, information of additional uplink grant resources in the ACK/NACK message when the indicator indicates that the second packet is pending for transmission from the UE to the base station,
wherein the base station allocates the additional uplink grant resources to the UE for transmitting the second packet.

9. The method of claim 1, further comprising:
receiving the data through a set of one or more logical channels that are enabled for data transmission in the RRC_Inactive state, wherein the amount of the data is calculated based on the received data through the set of one or more logical channels.

10. The method of claim 1, wherein the RA procedure is initiated when the amount of the data is higher than the first threshold configured to the UE.

11. A user equipment (UE) for wireless communication, the UE comprising:
one or more non-transitory computer-readable media having computer-executable instructions embodied thereon; and
at least one processor coupled to the one or more non-transitory computer-readable media, and configured to execute the computer-executable instructions to:
initiate, by the UE, a random access (RA) procedure for transmitting data to a base station based on comparing an amount of the data with a first threshold configured to the UE;
transmit, in a Radio Resource Control (RRC) Inactive (RRC_Inactive) state, at least one packet of the data to the base station using the RA procedure;
receive, in the RRC_Inactive state, an acknowledgement or non-acknowledgement (ACK/NACK) message from the base station in response to the at least one packet transmitted by the UE; and
initiate, by the UE, an RRC Resume procedure to transition from the RRC_Inactive state to an RRC Connected (RRC_Connected) state and transmit pending packets of the data in the RRC Connected state when at least one of (i) the amount of the data is higher than a second threshold configured to the UE and (ii) the pending packets are not transmittable using the RA procedure, wherein the UE initiates the RRC Resume procedure without receiving an instruction from the base station to initiate the RRC Resume procedure.

12. The UE of claim 11, wherein the ACK/NACK message includes an instruction to the UE to stay in the RRC_Inactive state.

13. The UE of claim 11, wherein the at least one processor is further configured to execute the computer-executable instructions to:
transmit a random access preamble to the base station,
wherein the random access preamble is associated with random access resources including time and/or frequency radio resources that are reserved for a plurality of UEs by the base station for data transmission.

14. The UE of claim 11, wherein the at least one processor is further configured to execute the computer-executable instructions to:
provide capability information to the base station, the capability information indicating whether the UE supports operations in the RRC_Inactive state.

15. The UE of claim 11, wherein the at least one processor is further configured to execute the computer-executable instructions to:
receive a pre-configured random access configuration in an RRC configuration message; and
apply the pre-configured random access configuration in the random access procedure to transmit the at least one packet to the base station,
wherein the pre-configured random access configuration comprises at least one of a pre-configured bandwidth part (BWP) configuration, a plurality of access control parameters, a UE identifier (ID), and a time pattern of random access.

16. The UE of claim 15, wherein one of the plurality of access control parameters comprises a parameter indicating the amount of the data.

17. The UE of claim 11, wherein the at least one packet includes an indicator indicating whether a second packet is pending for transmission from the UE to the base station.

18. The UE of claim 17, wherein the at least one processor is further configured to execute the computer-executable instructions to:
receive information of additional uplink grant resources in the ACK/NACK message when the indicator indicates that the second packet is pending for transmission from the UE to the base station,
wherein the base station allocates the additional uplink grant resources to the UE for transmitting the second packet.

19. The UE of claim 11, wherein the at least one processor is further configured to execute the computer-executable instructions to:
receive the data through one or more of a plurality of logical channels, wherein the one or more of the plurality of logical channels are only enabled for data transmission in the RRC_Inactive state.

20. The UE of claim 11, wherein the at least one processor is further configured to execute the computer-executable instructions to:
initiate the RA procedure when the amount of the data is higher than the first threshold configured to the UE.

* * * * *